United States Patent
Fujiwara et al.

(10) Patent No.: US 8,229,217 B2
(45) Date of Patent: Jul. 24, 2012

(54) IMAGE PROCESSING METHOD AND APPARATUS, IMAGE PROCESSING PROGRAM AND MEDIUM STORING THIS PROGRAM

(75) Inventors: Shinya Fujiwara, Saitama (JP); Tetsuro Ashida, Saitama (JP); Seiji Tanaka, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/266,084

(22) PCT Filed: Oct. 13, 2010

(86) PCT No.: PCT/JP2010/068417
§ 371 (c)(1),
(2), (4) Date: Oct. 24, 2011

(87) PCT Pub. No.: WO2011/118071
PCT Pub. Date: Sep. 29, 2011

(65) Prior Publication Data
US 2012/0082380 A1   Apr. 5, 2012

(30) Foreign Application Priority Data

Mar. 25, 2010 (JP) ................. 2010-070594

(51) Int. Cl.
*G06K 9/00* (2006.01)
*G06K 9/20* (2006.01)
*G06K 9/36* (2006.01)
*G06K 9/40* (2006.01)
*H04N 7/01* (2006.01)
*H04N 11/20* (2006.01)
*G09G 5/02* (2006.01)
*G03F 3/08* (2006.01)

(52) U.S. Cl. ........ 382/167; 382/162; 382/254; 382/282; 348/453; 345/589; 358/518

(58) Field of Classification Search ............. 382/162, 382/167, 254–255, 260–261, 263–264, 266, 382/268, 274–275, 282–283, 307; 345/589–605; 348/453–457; 358/515, 518–523
See application file for complete search history.

(56) References Cited

U.S. PATENT DOCUMENTS
5,117,283 A * 5/1992 Kroos et al. ............ 348/564
(Continued)

FOREIGN PATENT DOCUMENTS
JP   2006-14261 A   1/2006
(Continued)

OTHER PUBLICATIONS

B. Kim, R. Park, Detection and correction of purple fringing using color desaturation in the xy chromaticity diagram and the gradient information, Image and Vision Computing, vol. 28, Issue 6, Available Online Nov. 26, 2009, pp. 952-964.*

*Primary Examiner* — Anand Bhatnagar
*Assistant Examiner* — Nathan Bloom
(74) *Attorney, Agent, or Firm* — Birch, Stewart, Kolasch & Birch, LLP

(57) ABSTRACT

Whether purple fringing (PF) has occurred is determined for every pixel of interest $P(i,j)$ (step 41). The RGB ratio of a purple-fringed pixel $P(i,j)$ at which PF has been determined and the RGB ratio of a PF convergence pixel $P(m,n)$ spaced N pixels away from the purple-fringed pixel $P(i,j)$ within a zone in the proximity of the purple-fringed pixel $P(i,j)$ are calculated (steps 42, 43). A correction coefficient $Rev(i,j)$ that causes the RGB ratio of the purple-fringed pixel $P(i,j)$ to approach the RGB ratio of the PF convergence pixel $P(m,n)$ is calculated (step 44). The purple-fringed pixel $P(i,j)$ is color-corrected using the correction coefficient $Rev(i,j)$ calculated. Purple fringing is made inconspicuous by changing the color of image portions at which purple fringing has occurred.

19 Claims, 21 Drawing Sheets

U.S. PATENT DOCUMENTS

| | | |
|---|---|---|
| 7,529,405 B2 | 5/2009 | Masuno et al. |
| 7,656,437 B2 | 2/2010 | Yamada et al. |
| 7,916,937 B2 | 3/2011 | Utsugi et al. |
| 8,013,928 B2 | 9/2011 | Egawa |
| 2007/0153341 A1* | 7/2007 | Kang .............................. 358/529 |
| 2008/0137947 A1* | 6/2008 | Sawada et al. ................. 382/167 |
| 2008/0291312 A1 | 11/2008 | Egawa |
| 2009/0153696 A1* | 6/2009 | Suwabe et al. .............. 348/223.1 |
| 2009/0189997 A1* | 7/2009 | Stec et al. ................... 348/222.1 |
| 2009/0273690 A1 | 11/2009 | Nashizawa |
| 2010/0188400 A1* | 7/2010 | Chen et al. .................... 345/420 |
| 2010/0231603 A1* | 9/2010 | Kang ............................. 345/591 |
| 2012/0008859 A1* | 1/2012 | Schwartz ...................... 382/165 |
| 2012/0057041 A1* | 3/2012 | Stec et al. ................... 348/222.1 |

FOREIGN PATENT DOCUMENTS

| | | |
|---|---|---|
| JP | 2006-135745 A | 5/2006 |
| JP | 2008-289090 A | 11/2008 |
| JP | 2009-17544 A | 1/2009 |
| JP | 2009-268033 A | 11/2009 |
| WO | WO 2005/101854 A1 | 10/2005 |

\* cited by examiner

IMAGE PROCESSING METHOD AND APPARATUS, IMAGE PROCESSING PROGRAM AND MEDIUM STORING THIS PROGRAM

TECHNICAL FIELD

This invention relates to an image processing method and apparatus, an image processing program and a medium on which this program has been recorded.

BACKGROUND ART

There are instances where color bleeding (a purple fringe) is visually recognized in an image obtained by imaging using a digital still camera or the like. If a contour (an edge) exhibiting a large difference in luminance is present in a captured image owing to imaging of a high-luminance subject (e.g., a light source), a purple fringe readily occurs at the periphery of the image edge.

According to Japanese Patent Application Laid-Open No. 2009-268033, bleeding is reduced by making the amount of bleed of a blue (B) signal (the slope of the signal quantity) the same as that of a green (G) signal. However, in the case of an image in which a green-color background exists about the periphery of a white light source, the slope of blue (B) is much steeper than the slope of green (G). In such case there is the possibility that a gray color will be produced if the amount of color bleed of the blue (B) signal (the slope of the signal quantity) is made the same as that of the green (G) signal. Further, color continuity becomes unnatural in the vicinity of image portions where the amount of bleed has been changed.

According to International Publication No. WO2005/101854, it is described that purple fringing is made inconspicuous by lowering the saturation of areas in which purple fringing occurs. The color of an area in which purple fringing occurs remains the color purple. Further, if saturation is reduced partially, color continuity becomes unnatural in the vicinity of the area in which purple fringing occurs.

DISCLOSURE OF THE INVENTION

An object of the present invention is to make purple fringing inconspicuous by changing the color of an image portion in which purple fringing has occurred.

A further object of the present invention is to implement a color correction in which color continuity is natural.

An image processing method according to a first aspect of the present invention comprises the steps of: accepting input of applied image data; determining whether purple fringing has occurred pixel by pixel with regard to the accepted image data; calculating an RGB ratio of a purple-fringed pixel at which occurrence of purple fringing has been determined and an RGB ratio of a purple-fringe convergence pixel spaced a prescribed number of pixels away from the purple-fringed pixel within a zone in the proximity of the purple-fringed pixel; calculating a purple-fringe correction coefficient that causes the RGB ratio of the purple-fringed pixel to approach the RGB ratio of the purple-fringe convergence pixel; and correcting the color of the purple-fringed pixel using the calculated purple-fringe correction coefficient. The purple-fringe convergence pixel may be a pixel at which it is determined that purple fringing has not occurred. In any case, a pixel at a position spaced a prescribed number of pixels away from a purple-fringed pixel within a zone in the proximity of a pixel at which occurrence of purple fringing has been determined (namely the purple-fringed pixel) is adopted as the purple-fringe convergence pixel.

An image processing apparatus according to a first aspect of the present invention comprises: an image data input unit for accepting input of applied image data; a purple-fringe determination circuit for determining whether purple fringing has occurred pixel by pixel with regard to the image data accepted by the image data input unit; an RGB ratio calculation circuit for calculating an RGB ratio of a purple-fringed pixel at which occurrence of purple fringing has been determined by the purple-fringe determination circuit and an RGB ratio of a purple-fringe convergence pixel spaced a prescribed number of pixels away from the purple-fringed pixel within a zone in the proximity of the purple-fringed pixel; a purple-fringe correction coefficient calculation circuit for calculating a purple-fringe correction coefficient that causes the RGB ratio of the purple-fringed pixel to approach the RGB ratio of the purple-fringe convergence pixel; and a purple-fringe reducing unit for correcting the color of the purple-fringed pixel using the purple-fringe correction coefficient calculated by the purple-fringe correction coefficient calculation circuit.

The first aspect of the present invention also provides a program for causing a computer system to operate (function) as the above-described image processing apparatus, and a recording medium on which this program has been recorded. When the program is executed by a general-purpose computer system, the general-purpose computer system functions as the above-described image processing apparatus. The recording medium includes a magnetic recording medium, an optical disk, a magneto-optical disk and a semiconductor memory.

In accordance with the first aspect of the present invention, a color correction that causes the RGB ratio of a purple-fringed pixel to approach the RGB ratio of a purple-fringe convergence pixel is carried out. The color of the purple-fringed pixel is therefore corrected to a color that is not recognized as the color purple or to a color that is difficult to recognize as the color purple.

The position spaced a prescribed number of pixels away from the purple-fringed pixel within a zone in the proximity of the purple-fringed pixel is decided in accordance with the size of an area that includes the purple-fringed pixel present within an image represented by the applied image data, the type of lens used in a digital camera employed to capture the image data that is the cause of occurrence of purple fringing, the chromatic coma aberration of the lens and the number of pixels constituting the image sensor. In any case, the purple-fringe convergence pixel is a pixel present within a zone in the proximity of the purple-fringed pixel. Therefore, even though the color of the purple-fringed pixel changes owing to the fact that the RGB ratio of the purple-fringed pixel approaches the RGB ratio of the purple-fringe convergence pixel, the color after the change is one that is harmonized to the color within the zone in the proximity of the purple-fringed pixel. A color correction exhibiting a color continuity that is unnatural can be prevented. The proximity zone may be a predetermined range or a range determined by a user setting.

In one embodiment, the purple-fringe correction coefficient is a correction coefficient applied to at least one of a blue-component signal and red-component signal of the purple-fringed pixel. Purple fringing occurs owing to the fact that a blue-component signal has a signal level (signal quantity) higher than that of a green-component signal. Purple fringing can be suppressed effectively by applying a color correction to the blue-component signal. Naturally, purple fringing can be suppressed also by applying a color correction to the red-component signal.

Preferably, from among peripheral pixels of an image contour (edge) exhibiting a luminance difference (luminance gradient) greater than a prescribed level, a pixel for which at least a blue-component signal level is higher than a green-component signal level by more than a prescribed threshold value is determined to be a purple-fringed pixel. The reason for this is that purple fringing is characterized in that it is readily produced at an image contour having a large luminance difference and because the blue-component signal level is high in comparison with the green-component signal level. From among peripheral pixels of an image contour having a luminance difference greater than a prescribed level, a pixel for which at least the blue-component signal level is higher than the green-component signal level by more than a prescribed threshold value is determined to be a purple-fringed pixel, thereby enabling a purple-fringed pixel to which the color correction is to be applied to be found comparatively reliably.

In another embodiment, a pixel situated along a direction in which a luminance difference of an image contour in the vicinity of the purple-fringed pixel is largest, and along which luminance decreases, is used as the purple-fringe convergence pixel. A color correction can be applied which reduces the signal quantity of the blue-component signal or red-component signal of the purple-fringed pixel, which is characterized by the fact that the signal quantity of the red-component signal or blue-component signal is large.

Preferably, in a case where the purple-fringe correction coefficient increases the signal quantity of at least one of the blue-component signal and red-component signal of the purple-fringed pixel, the purple-fringe correction coefficient is adjusted in such a manner that the effect of the color correction of the purple-fringed pixel is weakened. In a case where a correction coefficient that increases the signal quantity of at least one of the blue-component signal and red-component signal of the purple-fringed pixel is obtained as the purple-fringe correction coefficient owing to erroneous detection of the purple-fringed pixel, etc., a deleterious effect ascribable to the color correction can be mitigated by weakening the effect of the color correction.

An image processing method according to a second aspect of the present invention comprises the steps of: accepting input of applied image data; calculating, pixel by pixel of interest with regard to the accepted image data, luminances of pixels at respective ones of positions symmetrical about the pixel of interest as center with regard to at least one direction among a horizontal direction, vertical direction and oblique direction; calculating differences between the calculated luminances; selecting the maximum luminance difference among the luminance differences calculated; calculating a weighting which is smaller the smaller the maximum luminance difference selected; calculating an RGB ratio of the pixel of interest and an RGB ratio of a spaced-away pixel spaced a prescribed number of pixels away from the pixel of interest within a zone in the proximity of the pixel of interest; calculating a correction coefficient that causes the RGB ratio of the pixel of interest to approach the RGB ratio of the spaced-away pixel; and correcting the color of the pixel of interest using a weighted correction coefficient obtained by weighting the calculated correction coefficient by the weighting.

An image processing apparatus according to a second aspect of the present invention comprises: an image data input unit for accepting input of applied image data; a luminance calculation circuit for calculating, pixel by pixel of interest with regard to the image data accepted by the image data input unit, luminances of pixels at respective ones of positions symmetrical about the pixel of interest as center with regard to at least one direction among a horizontal direction, vertical direction and oblique direction; a luminance-difference calculation circuit for calculating differences between the luminances calculated by the luminance calculation circuit; a maximum-luminance-difference selecting unit for selecting the maximum luminance difference calculated by the luminance calculation circuit; a weighting calculation circuit for calculating a weighting which is smaller the smaller the maximum luminance difference selected by the maximum-luminance selecting unit; an RGB value calculation circuit for calculating an RGB ratio of the pixel of interest and an RGB ratio of a spaced-away pixel spaced a prescribed number of pixels away from the pixel of interest within a zone in the proximity of the pixel of interest; a correction coefficient calculation circuit for calculating a correction coefficient that causes the RGB ratio of the pixel of interest to approach the RGB ratio of the spaced-away pixel; and a color correcting circuit for correcting the color of the pixel of interest using a weighted correction coefficient obtained by weighting the correction coefficient, which has been calculated by the correction coefficient calculation circuit, by the weighting calculated by the weighting calculation circuit.

The second aspect of the present invention also provides a program for causing a computer system to operate (function) as the above-described image processing apparatus, and a recording medium on which this program has been recorded.

Purple fringing occurs at the periphery of an image contour exhibiting a large luminance difference. If the maximum luminance difference between pixels at positions symmetrical about the pixel of interest as center is large, then it can be said that this pixel of interest is a pixel at which the occurrence of purple fringing is highly likely. Conversely, if the maximum luminance difference between pixels at positions symmetrical about the pixel of interest as center is small, then it can be said that this pixel of interest is a pixel at which purple fringing has not occurred. In accordance with the second aspect of the present invention, the smaller the maximum luminance difference between pixels at positions symmetrical about the pixel of interest as center, the smaller a weighting that is calculated. A correction coefficient is weighted by the weighting calculated. It is arranged so that a color-correcting effect based upon the correction coefficient is produced at a pixel where there is a high possibility that purple fringing has occurred, and so that a color-correcting effect based upon the correction coefficient is not produced at or is weakened at a pixel where there is a low possibility that purple fringing has occurred.

Preferably, a weighting calculated in a case where the maximum luminance difference is smaller than a prescribed value eliminates the effect of color correction by the weighted correction coefficient. In a case where the maximum luminance difference is a value so low that there is no possibility of the occurrence of purple fringing, it is determined that purple fringing has not occurred at this pixel of interest. Erroneous corrections can be reduced.

An image processing method according to a third aspect of the present invention comprises the steps of: accepting input of applied image data; determining, pixel by pixel of interest with regard to the accepted image data, whether color cast of the pixel of interest is the color purple; calculating a weighting which is smaller the farther the color cast of the pixel of interest is from the color purple; calculating an RGB ratio of the pixel of interest and an RGB ratio of a spaced-away pixel spaced a prescribed number of pixels away from the pixel of interest within a zone in the proximity of the pixel of interest; calculating a correction coefficient that causes the RGB ratio of the pixel of interest to approach the RGB ratio of the spaced-away pixel; and correcting the color of the pixel of interest using a weighted correction coefficient obtained by weighting the calculated correction coefficient by the weighting.

An image processing apparatus according to a third aspect of the present invention comprises: an image data input unit for accepting input of applied image data; a color-cast determination unit for determining, pixel by pixel of interest with regard to the image data accepted by the image input unit, whether color cast of the pixel of interest is the color purple; a weighting calculation circuit for calculating a weighting which is smaller the farther the color cast of the pixel of interest is from the color purple; an RGB ratio calculation circuit for calculating an RGB ratio of the pixel of interest and an RGB ratio of a spaced-away pixel spaced a prescribed number of pixels away from the pixel of interest within a zone in the proximity of the pixel of interest; a correction coefficient calculation circuit for calculating a correction coefficient that causes the RGB ratio of the pixel of interest to approach the RGB ratio of the spaced-away pixel; and a color correcting circuit for correcting the color of the pixel of interest using a weighted correction coefficient obtained by weighting the correction coefficient, which has been calculated by the correction coefficient calculation circuit, by the weighting calculated by the weighting calculation circuit.

The third aspect of the present invention also provides a program for causing a computer system to operate (function) as the above-described image processing apparatus, and a recording medium on which this program has been recorded.

A purple fringe has a purple color cast as a characteristic thereof. If the color cast of the pixel of interest is the color purple or near the color purple, then it can be said that this pixel of interest is a pixel at which the occurrence of purple fringing is highly likely. Conversely, if the color cast of the pixel of interest is not the color purple, then it can be said that this pixel of interest is a pixel at which purple fringing has not occurred. In accordance with the third aspect of the present invention, the more the pixel of interest is a color far from the color purple, the smaller the weighting that is calculated. A correction coefficient is weighted by the weighting calculated. It is arranged so that a color-correcting effect based upon the correction coefficient is produced at a pixel where there is a high possibility that purple fringing has occurred, and so that a color-correcting effect based upon the correction coefficient is not produced at or is weakened at a pixel where there is a low possibility that purple fringing has occurred. Whether a color is one far or near from the color purple is determined using color difference data (Cr data and Cb data), by way of example.

Preferably, a weighting calculated in a case where the color cast of the pixel of interest is a color cast not recognized as the color purple eliminates the color-correcting effect based upon the weighted correction coefficient. Erroneous corrections can be reduced.

BEST MODE FOR CARRYING OUT THE INVENTION

First Embodiment

Figure 1:
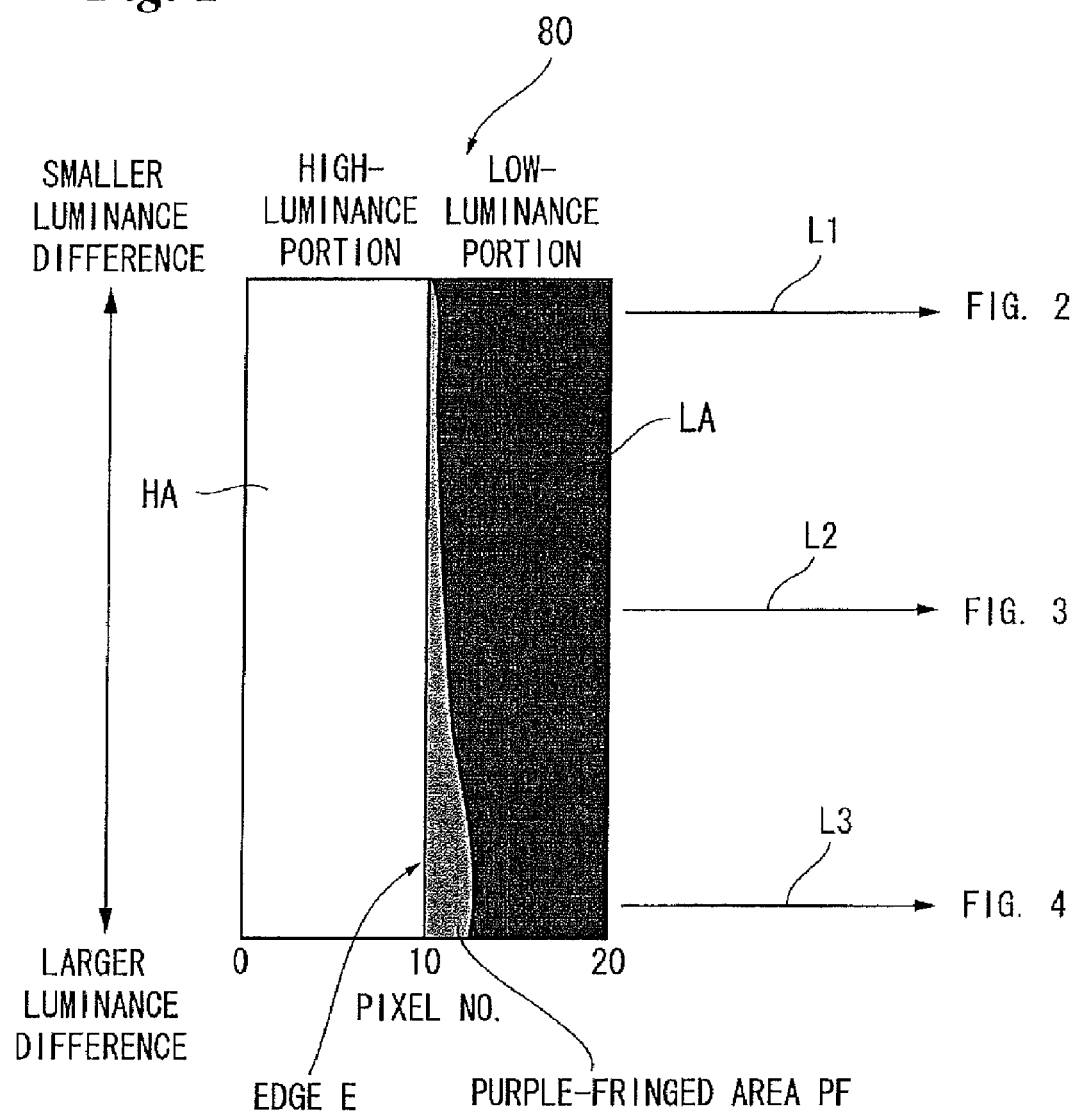
FIG. 1 illustrates an example of an image in which purple fringing has occurred.
Figure 2:
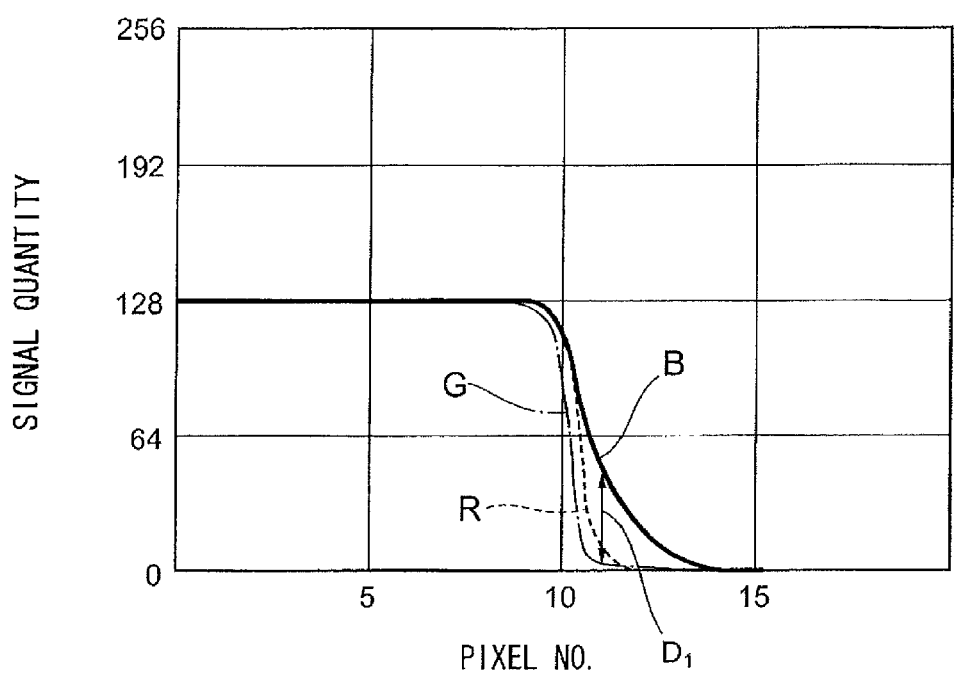
FIG. 2 is a graph of RGB signal quantities at every pixel position.
Figure 3:
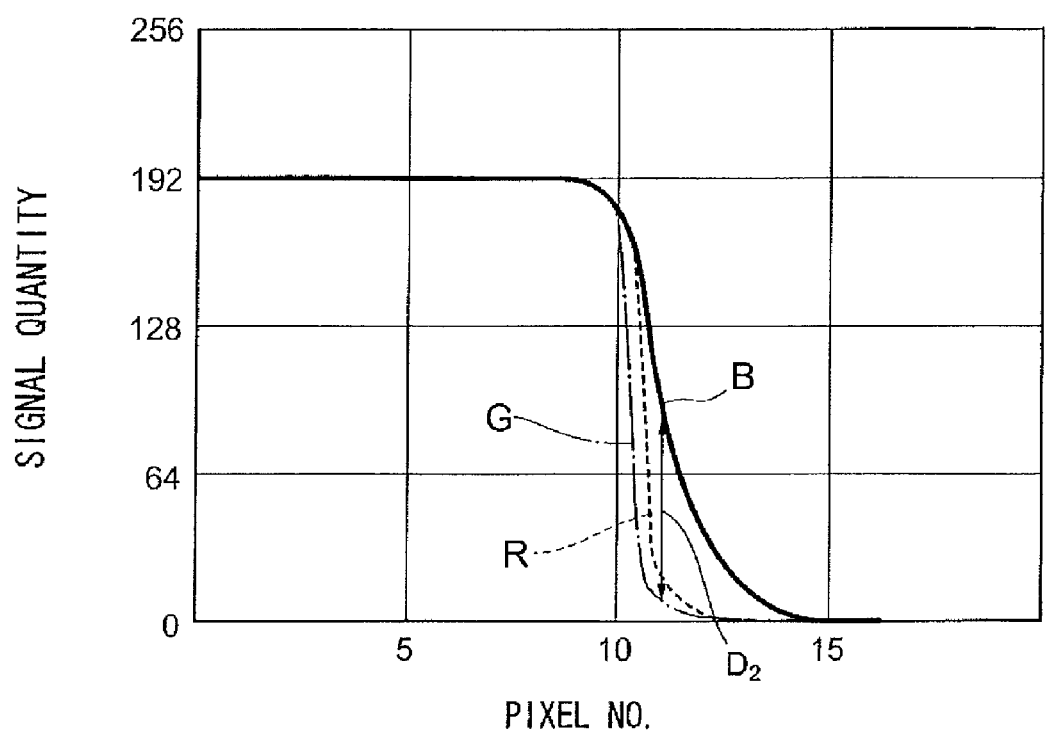
FIG. 3 is a graph of RGB signal quantities at every pixel position.
Figure 4:
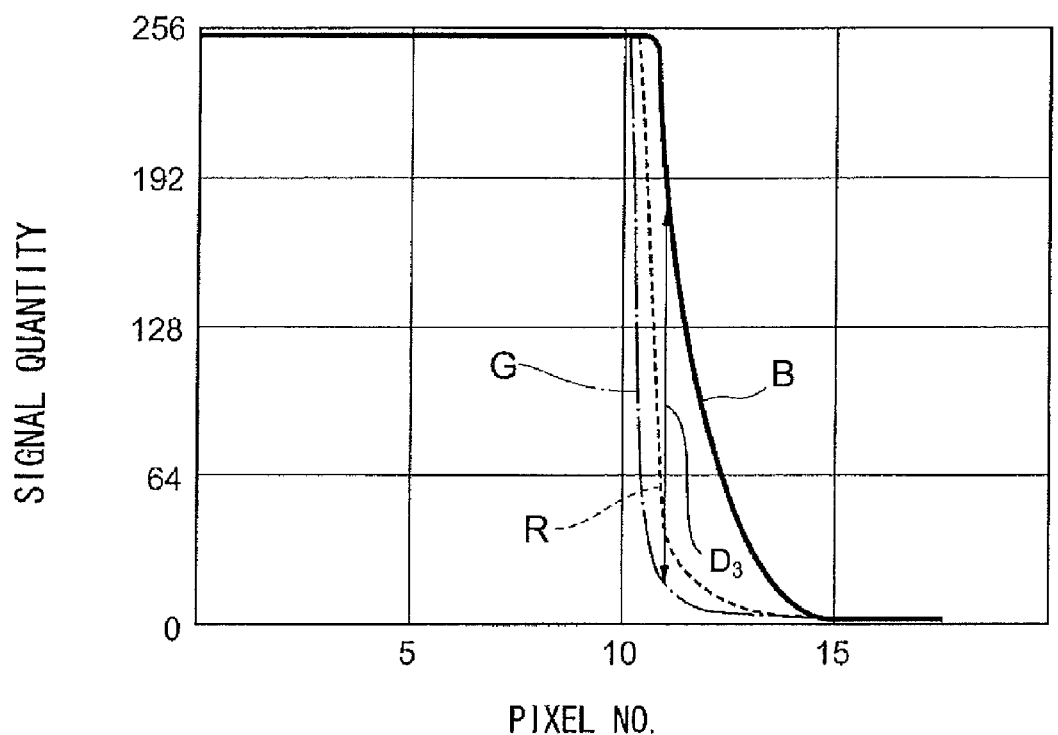
FIG. 4 is a graph of RGB signal quantities at every pixel position.

FIG. 1 illustrates an image 80 in which purple fringing has occurred. FIGS. 2, 3 and 4 are graphs corresponding to three line positions L1, L2, L3, respectively, which are shown in the image 80 depicted in FIG. 1, and illustrate signal quantities (strengths) of R, G, B components at every pixel position.

Purple fringing is a phenomena in which, when a high-luminance subject (e.g., a light source) is imaged, the periphery of the image contour bleeds into a purple color. Such purple fringing readily occurs at contour portions of an image where a difference in luminance is large. The larger the luminance difference at a contour portion, the more readily recognizable purple fringing becomes.

A white-color high-luminance portion HA and a black-color low-luminance portion LA are contiguous in the image 80 shown in FIG. 1. The boundary between the high-luminance portion HA and the low-luminance portion LA is an image contour (edge) E. Purple fringing has occurred at the periphery of the image edge E. An area (zone) in which purple fringing has occurred in the image 80 is indicated as a purple-fringed area PF.

The luminance of the high-luminance portion HA in image 80 declines as the upper side thereof is approached. The luminance of the low-luminance portion LA is constant. That is, the difference in luminance between the high-luminance portion HA and the low-luminance portion LA in the vicinity of the lower end of image 80 is very large, and the difference in luminance between the high-luminance portion HA and the low-luminance portion LA in the vicinity of the upper end of image 80 is smaller.

With reference to FIGS. 2 to 4, when viewed in terms of RGB components, purple fringing manifests itself as the color purple owing to the fact that the signal quantity of the blue (B) component or signal quantities of the blue (B) component and red (R) component is (are) larger than the signal quantity of the green (G) component. Double-ended arrows $D_1$ to $D_3$ in FIGS. 2 to 4 indicate differences between the signal quantity of the blue (B) component and the signal quantity of the green (G) component at a pixel position in the neighborhood of the image edge E. The larger the luminance difference between the high-luminance portion HA and the low-luminance portion LA, the larger the difference between the signal quantity of the blue (B) component and the signal quantity of the green (G) component at the pixel position in the neighborhood of the image edge E ($D_1 < D_2 < D_3$). The purple-fringed area PF also increases in size and becomes more conspicuous in proportion to the difference between the signal quantities (FIG. 1).

In this embodiment of the present invention, a digital still camera equipped with an image processing apparatus that reduces the above-mentioned purple fringing will be described. The digital camera executes image processing for reducing purple fringing in an image having the purple-fringed area PF.

Figure 5:
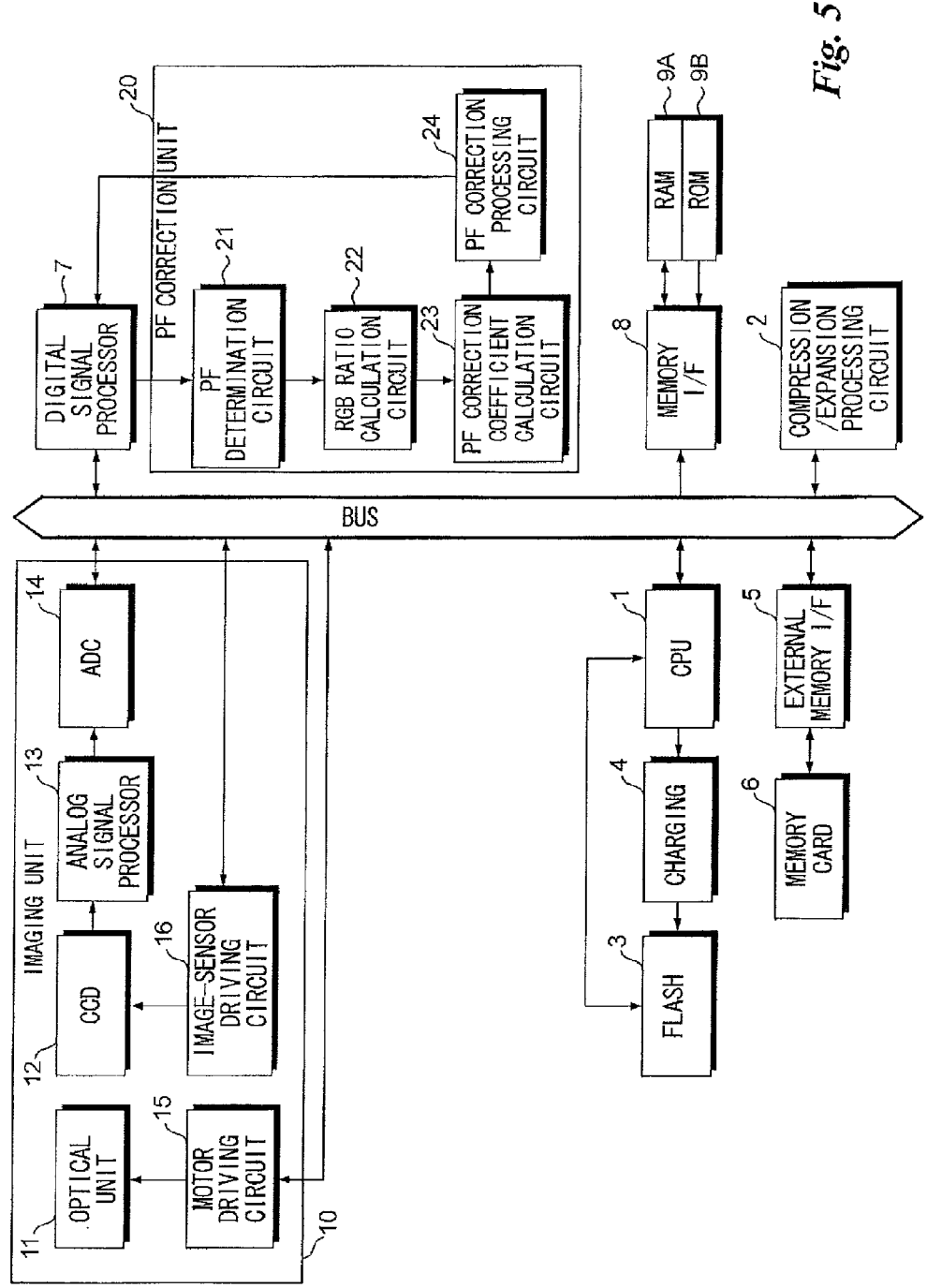
FIG. 5 is a block diagram illustrating the electrical configuration of a digital still camera according to a first embodiment.

FIG. 5 is a block diagram schematically illustrating the electrical configuration of a digital still camera according to the first embodiment.

The overall operation of the digital still camera is controlled by a CPU 1.

The CPU 1 is connected via a data bus to an imaging unit 10, a digital signal processor 7, an external memory interface (external memory I/F) 5, a memory interface (memory I/F) 8 and a compression/expansion processing circuit 2.

The imaging unit 10 has a CCD 12 and has an optical unit 11, which includes an imaging lens, a diaphragm, an infrared cutting filter and an optical low-pass filter (OLPF), provided in front of the CCD 12.

The digital still camera is equipped with a flash 3 for flash imaging and a charging circuit 4 for supplying the flash 3 with power. A light-emission command to the flash and a charge command to the charging circuit 4 are issued by the CPU 1.

When the power supply of the digital still camera is turned on and the shooting mode is set, light rays representing the image of the subject impinge upon the optical unit 11. The light rays impinge upon the photoreceptor surface of the CCD 12 via the optical unit 11. A number of photodiodes (optoelectronic transducers) are arrayed two-dimensionally on the photoreceptor surface of the CCD 12, and color filters for red (R), green (G), blue (B) arrayed to have a prescribed array structure (that of a Bayer array, G-stripe array, etc.) are provided on the photoreceptor surface. The image of the subject formed by the optical unit 11 is sensed electronically by the CCD 12. The CCD 12 is driven by an image-sensor driving circuit 16 for outputting a timing signal, etc., in accordance with a command from the CPU 1.

An analog signal representing the image of the subject output from the CCD 12 is input to an analog signal processor 13.

The analog signal processor 13 includes a correlated double sampling circuit and a signal amplifier, etc. The analog signal representing the image of the subject output from the CCD 12 is input to the analog signal processor 13 and subjected to correlated double sampling and signal amplification, etc. An analog video signal (analog RGB signal) that has been output from the analog signal processor 13 is input to an analog/digital converting circuit (ADC) 14, where the signal is converted to digital image data (digital RGB data) following execution of prescribed signal processing. Further, the RGB data is converted as necessary to image data (YUV data) comprising luminance data (Y data) and color difference data (Cr, Cb data).

Under the control of the memory I/F 8, the digital image data is recorded temporarily in a RAM 9A. A ROM 9B also is connected to the memory I/F 8. A control program executed by the CPU 1, various data necessary for control and various settings information relating to operation of the digital still camera, such as photographer settings information, have been stored in the ROM 9B.

The digital image data is read out of the RAM 9A and input to the digital signal processor 7. The digital signal processor 7 executes prescribed digital signal processing such as a white balance adjustment, a gamma correction and synchronization processing (processing for converting color signals to a simultaneous system by interpolating a color-signal spatial shift that accompanies the color filter array of a single-chip CCD). The image of the subject represented by the data that has undergone the digital signal processing is displayed on the display screen of a display unit (not shown).

When a shutter-release button (not shown) is pressed through a first step, the lens of the optical unit 11 is driven by a motor driving circuit 15 to perform focusing. Luminance data is obtained in the digital signal processor 7 based upon the image data read out of the RAM 9A. Data representing an integrated value of the luminance data is applied to the CPU 1 and the amount of exposure is calculated. The aperture of the diaphragm of the optical unit 11 is controlled by the motor driving circuit 15 in such a manner that the calculated amount of exposure is obtained, and the shutter speed of the CCD 12 is controlled by the image-sensor driving circuit 16.

When the shutter-release button (not shown) is pressed through a second step, image data that has been output from the analog/digital converting circuit 14 is stored in the RAM 9A. Image data that has been read out of the RAM 9A is subjected to prescribed digital signal processing by the digital signal processor 7 in the manner described above. Image data that has been output from the digital signal processor 7 is compressed in the compression/expansion processing circuit 2. The compressed image data is recorded on a memory card 6 by control exercised by the external memory I/F 5.

If the playback mode is set, compressed image data that has been recorded on the memory card 6 is read. The compressed image data that has been read is expanded in the compression/expansion processing circuit 2 and then applied to the display unit, whereby a reproduced image is displayed.

A purple-fringe correction unit (PF correction unit) 20 is connected to the digital signal processor 7. The PF correction unit 20 includes a purple-fringe determination circuit (PF determination circuit) 21, an RGB ratio calculation circuit 22, a purple-fringe correction coefficient calculation circuit (PF correction coefficient calculation circuit) 23 and a purple-fringe correction processing circuit (PF correction processing circuit) 24. Image processing for reducing the above-mentioned purple fringing is executed in the PF correction unit 20. The image processing executed by the PF correction unit 20 for reducing purple fringing may be turned on/off by a setting using a control panel (not shown) on the digital still camera, or the processing may be applied to the entirety of image data obtained by imaging and image data read out of the memory card 6 or to image data selected by the user.

Figure 6:
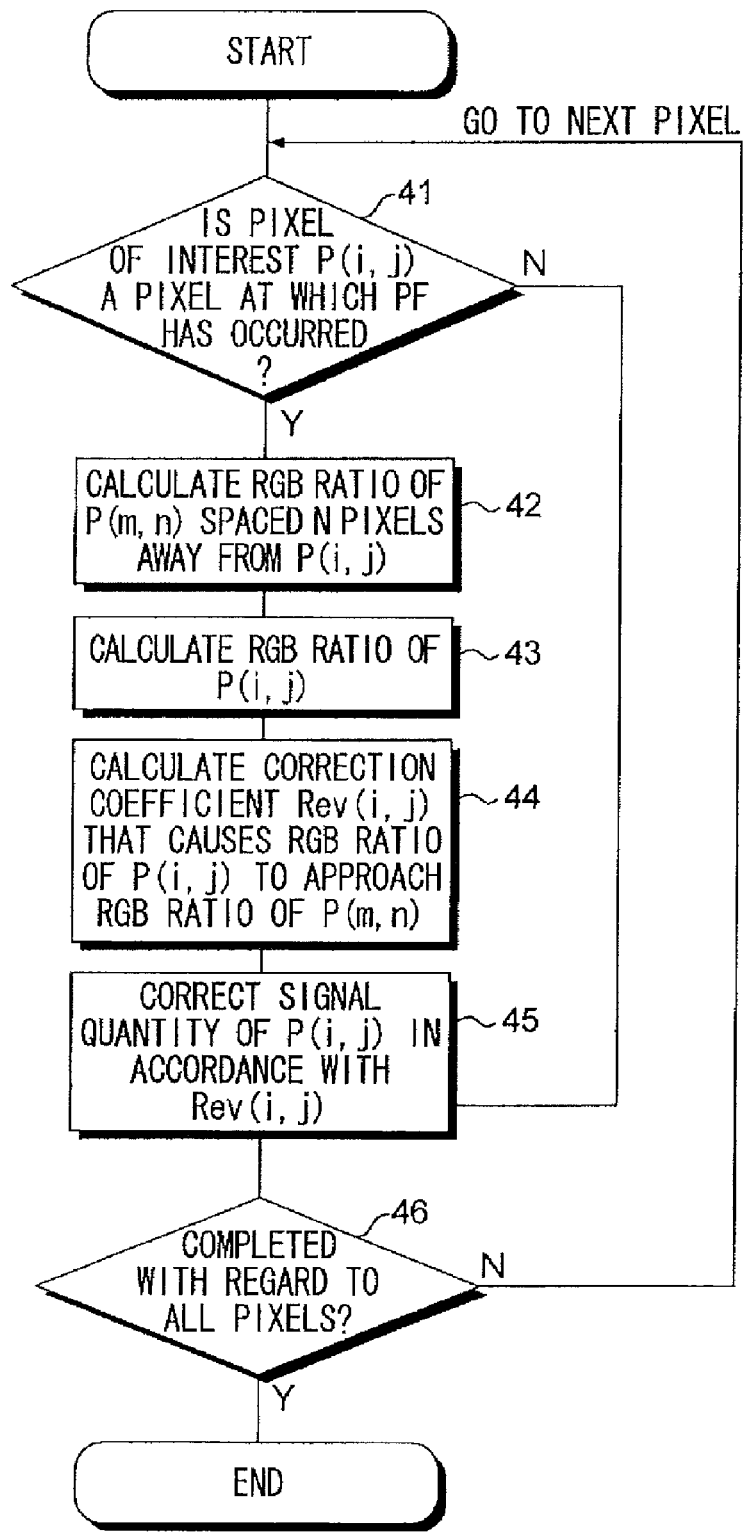
FIG. 6 is a flowchart illustrating the procedure of operation of a purple-fringe correction unit according to the first embodiment.

FIG. 6 is a flowchart illustrating the procedure of operation of the PF correction unit 20 according to the first embodiment. The PF determination circuit 21, RGB ratio calculation circuit 22, PF correction coefficient calculation circuit 23 and PF correction processing circuit 24 included in the PF correction unit 20 will be described with reference to FIG. 6.

Image data that has been applied to the PF correction unit 20 via the digital signal processor 7 is input to the PF determination circuit 21.

The PF determination circuit 21 determines whether purple fringing has occurred in the image of the subject represented by the applied image data. The determination as to whether purple fringing has occurred is applied with respect to each pixel constituting the image of the subject (step 41).

In one example, the determination as to whether purple fringing has occurred is made, with regard to a pixel to be processed [referred to as a "pixel of interest P(i,j)" below], based upon whether the signal quantity (strength) of the blue (B) component is greater than the signal quantity of the green (G) component by more than a prescribed threshold value. A pixel for which the signal quantity of the blue (B) component is greater than the signal quantity of the green (G) component by more than a prescribed first threshold value and for which the signal quantity of the red (R) component is greater than the signal quantity of the green (G) component by more than a prescribed second threshold value may be determined to be a pixel at which purple fringing has occurred. As mentioned earlier, the reason for this is that an image (pixel) representing a purple fringe is characterized in that the difference between the signal quantity of the blue (B) component and the signal quantity of the green (G) component is large and, moreover, there is a difference between the signal quantity of the red (R) component and the signal quantity of the green (G) component.

Further, since purple fringing readily occurs at the periphery of an image contour (edge) exhibiting a large difference in luminance, an image edge exhibiting a luminance difference (luminance gradient) greater than a prescribed level may be detected (extracted) in advance and whether purple fringing has occurred may be determined taking a pixel at the periphery of this image edge as the processing target.

If it is determined that purple fringing has not occurred at the pixel of interest P(i,j) ("NO" at step 41), then it is determined whether the processing of all pixels constituting the image of the subject has been completed (step 46). If processing of all pixels has not been completed, a pixel at a position shifted by one pixel in the horizontal or vertical direction is taken as the new pixel of interest P(i,j) and whether purple fringing has occurred is determined with respect to the new pixel of interest P(i,j) ("NO" at step 46; step 41).

If it is determined that purple fringing has occurred at the pixel of interest P(i,j) ("YES" at step 41), then the RGB ratio calculation circuit 22 selects a pixel P(m,n) [referred to as a "purple-fringe convergence pixel P(m,n)" below], at which purple fringing has not occurred, located at a position spaced N (where N is an integer) pixels away from this pixel of interest P(i,j) [referred to as a "purple-fringed pixel P(i,j)"] and calculates the RGB ratio of this pixel (step 42). As will be described later, the purple-fringed pixel P(i,j) is color-corrected in such a manner that the RGB ratio thereof will approach the RGB ratio of the purple-fringe convergence pixel P(m,n).

Figure 7:
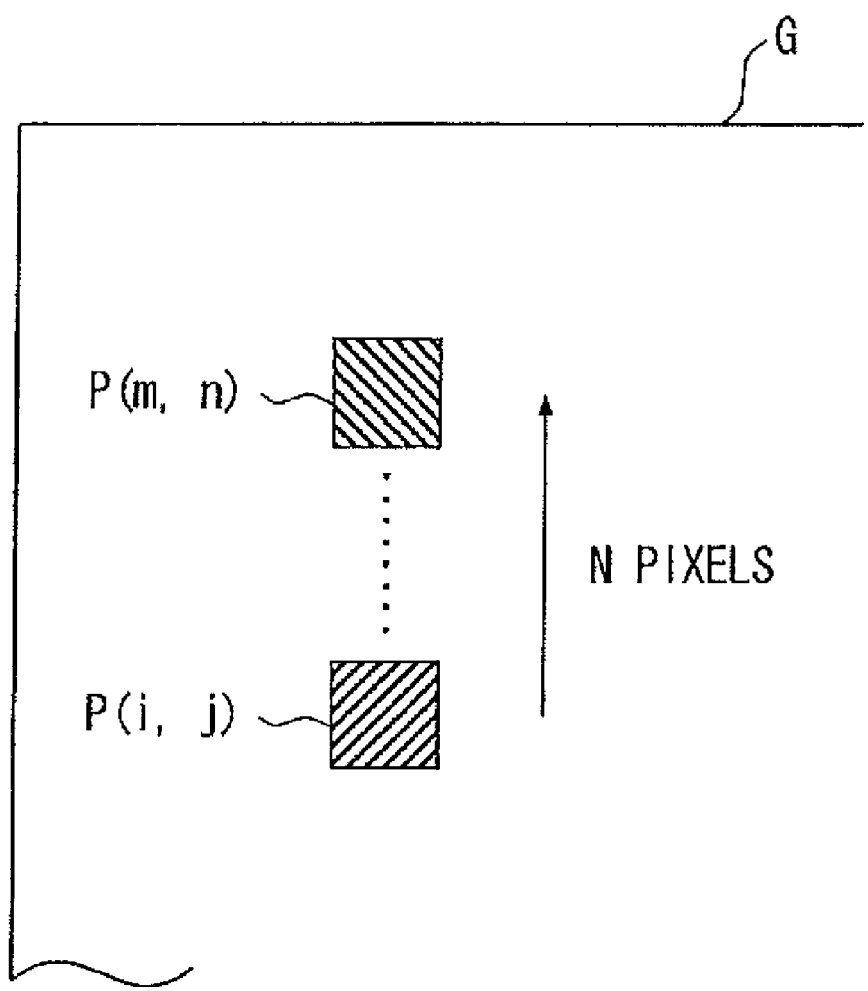
FIG. 7 illustrates an example of the positional relationship between a pixel of interest and a purple-fringe convergence pixel.

FIG. 7 illustrates an example of the positional relationship between the purple-fringed pixel P(i,j) and the purple-fringe convergence pixel P(m,n) on a subject image G. FIG. 7 illustrates the manner in which a pixel spaced N pixels away from the purple-fringed pixel P(i,j) in the vertical (upward) direction has been selected as the purple-fringe convergence pixel P(m,n).

The specific value "N" of the above-mentioned N pixels is decided in accordance with the characteristics of the lens and number of pixels of the CCD, etc., employed in the digital still camera used to capture the image data to be processed, by way of example. The reason is that the ease with which purple fringing occurs and the spread of purple fringing, etc., when it occurs are dependent upon the chromatic coma aberration of the lens and the number of pixels constituting the CCD, etc. For example, eight (8 pixels) is used as the value of N.

Further, as mentioned above, purple fringing readily occurs at the periphery of an image contour having a luminance difference greater than a prescribed level. Furthermore, since one characteristic of the purple-fringed pixel P(i,j) is that the signal quantity of the blue (B) component is much greater than the signal quantity of the green (G) signal component, it is necessary to lower the signal quantity of the blue (B) component in order to reduce purple fringing. Accordingly, what is adopted as the direction of the purple-fringe convergence pixel P(m,n) spaced N pixels away from the purple-fringed pixel P(i,j) is a direction (a direction perpendicular to the image contour) along the direction of maximum luminance difference at the image contour in the vicinity of the purple-fringed pixel P(i,j), this being a direction along which luminance decreases (namely a direction on the side of the low-luminance portion).

The pixel at the position spaced N pixels away from the purple-fringed pixel P(i,j) is selected as the purple-fringe convergence pixel P(m,n) and the RGB ratio is calculated in the manner described above. The RGB ratio of the purple-fringe convergence pixel P(m,n) takes on the following two values, by way of example:

$$B/G(m,n) \qquad \text{Equation 1}$$

$$R/G(m,n) \qquad \text{Equation 2}$$

Equation 1 represents the fact that the signal quantity of the blue (B) component of the purple-fringe convergence pixel P(m,n) is divided by the signal quantity of the green (G) component. Equation 2 represents the fact that the signal quantity of the red (R) component of the purple-fringe convergence pixel P(m,n) is divided by the signal quantity of the green (G) component.

Similarly, the RGB ratio of the purple-fringed pixel P(i,j) is calculated according to the following equations:

$$B/G(i,j) \qquad \text{Equation 3}$$

$$R/G(i,j) \qquad \text{Equation 4}$$

When the RGB ratios of the purple-fringe convergence pixel P(m,n) and purple-fringed pixel P(i,j) are calculated, the PF correction coefficient calculation circuit 23 calculates a correction coefficient Rev (i,j) that causes the RGB ratio of the purple-fringed pixel P(i,j) to approach the RGB ratio of the purple-fringe convergence pixel P(m,n). The correction coefficient Rev (i,j) includes a correction coefficient for correcting the blue (B) component and a correction coefficient for correcting the red (R) component. A correction coefficient RevB (i,j) for the blue (B) component is calculated according to the following equation:

$$\text{correction coefficient } RevB(i,j)=[B/G(m,n)]/[B/G(i,j)] \qquad \text{Equation 5}$$

As mentioned above, the signal quantity of the blue (B) component of the purple-fringed pixel P(i,j) is larger than the signal quantity of the green (G) component. Further, a pixel on the low-luminance side is adopted as the purple-fringe convergence pixel P(m,n). Accordingly, since the value of B/G (i,j) is larger than the value of B/G (m,n), the correction coefficient RevB (i,j) for the blue (B) component calculated according to Equation 5 above generally takes on a value smaller than 1.

Similarly, a correction coefficient RevR (i,j) for the red (R) component is calculated according to the following equation:

correction coefficient RevR(i,j)=[R/G(m,n)]/[R/G(i,j)]     Equation 6

Using the calculated correction coefficient Rev (i,j) (for the blue component and red component), the PF correction processing circuit 24 corrects the color of the purple-fringed pixel P(i,j). The blue (B) component of the purple-fringed pixel P(i,j) after the color correction is represented by the following equation:

blue (B) component of purple-fringed pixel P(i,j) after color correction=B(i,j)×RevB(i,j)     Equation 7

Similarly, the red (R) component of the purple-fringed pixel P(i,j) is color-corrected by the following equation:

red (R) component of purple-fringed pixel P(i,j) after color correction=R(i,j)×RevR(i,j)     Equation 8

Since the RGB ratio of the purple-fringed pixel P(i,j) is color-corrected in such a manner that it will approach the RGB ratio of the purple-fringe convergence pixel P(m,n), the purple-fringed pixel P(i,j) becomes one in which purple fringing has been eliminated or reduced.

Figure 8:
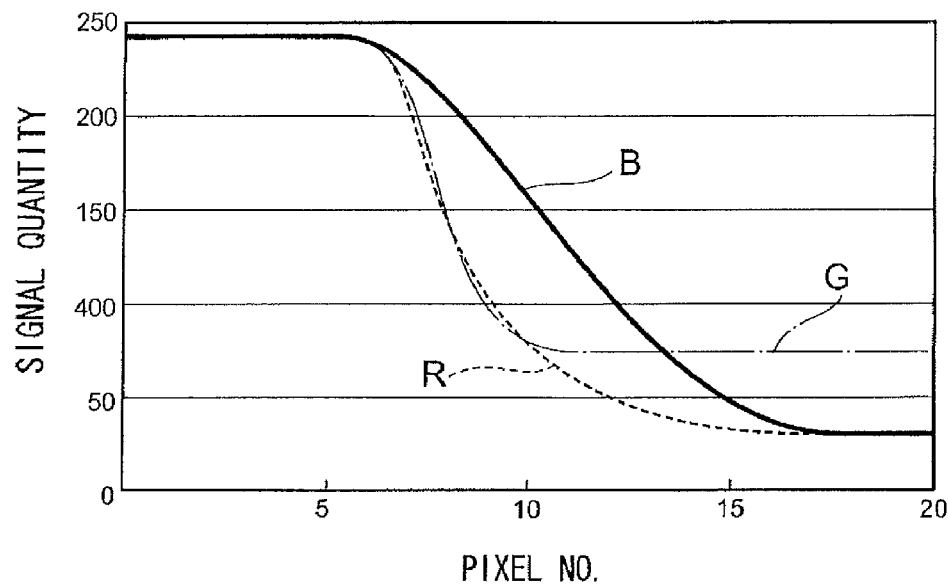
FIG. 8 is a graph of RGB signal quantities before a color correction.
Figure 9:
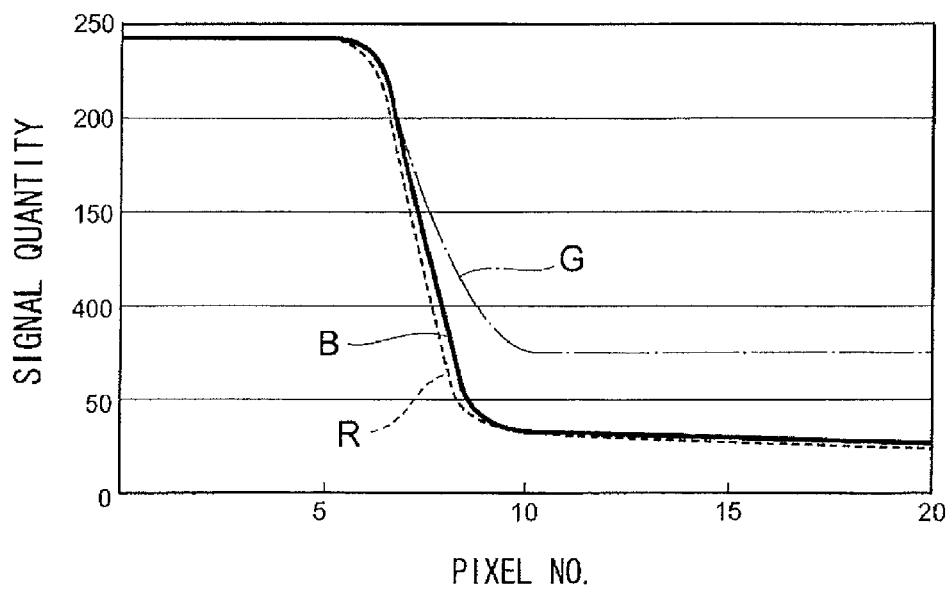
FIG. 9 is a graph of RGB signal quantities after a color correction by a purple-fringe correction unit.

FIGS. 8 and 9 illustrate the effects of color correction by the PF correction unit 20 described above, in which FIG. 8 shows a graph (RGB signal quantities) before execution of the color correction by the PF correction unit 20 and FIG. 9 a graph after execution of the color correction by the PF correction unit 20. With reference to FIG. 9, the color correction has been applied so as to lower the signal quantity of the blue (B) component signal in the pixel in which purple fringing has occurred. The red (R) component signal also is color-corrected in such a manner that its signal quantity is reduced. A color correction affording a natural color continuity from high- to low-luminance portions has been achieved.

In the first embodiment described above, both the blue (B) component signal and the red (R) component signal are color-corrected. However, since the blue (B) component signal is predominant in purple fringing, it may be arranged so that a color correction is applied only to the blue (B) component signal. Naturally, it may be arranged so that a color correction is applied only to the red (R) component signal. In an embodiment set forth below, basically a color correction of the blue (B) component signal will be described.

According to the first embodiment described above, purple-fringe correction processing (reduction processing) is executed by the PF correction unit 20. However, purple-fringe correction processing may just as well be executed by causing the CPU 1 or the digital signal processor 7 to execute processing similar to the processing performed by the PF correction unit 20. In such case a program for causing the CPU 1 or digital signal processor 7 to execute the above-described purple-fringe correction processing is stored in the ROM 9B. The above-mentioned program may be recorded on a recording medium such as a CD-ROM beforehand and then installed. Furthermore, a general-purpose computer system can also be made to execute the above-mentioned purple-fringe correction processing. If a program for causing a computer system to execute processing similar to that performed by the PF correction unit 20 is installed in the computer system, then the computer system will function as an image processing apparatus for executing purple-fringe correction processing. The same holds true for the following other embodiments.

Second Embodiment

Figure 10:
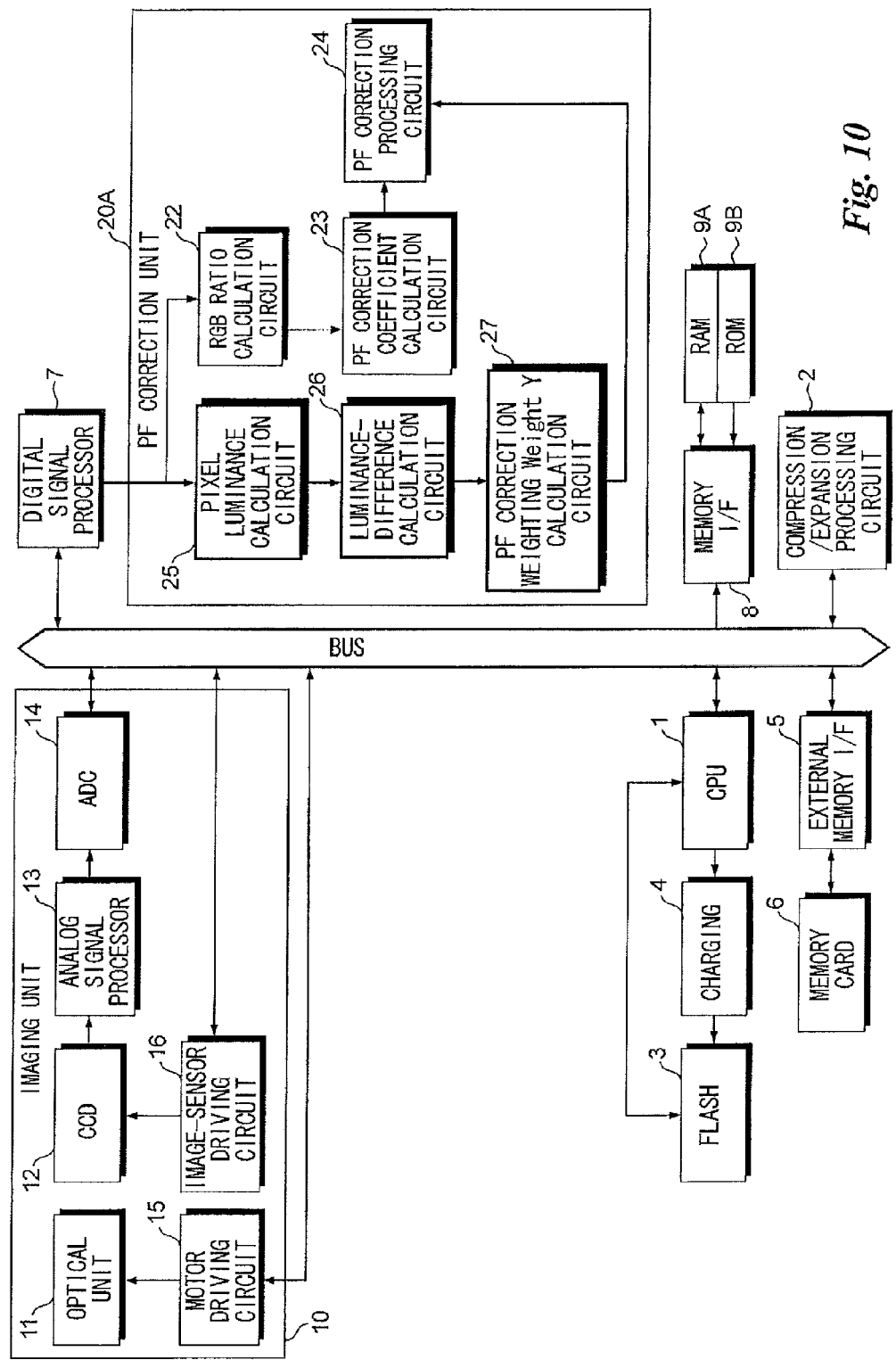
FIG. 10 is a block diagram illustrating the electrical configuration of a digital still camera according to a second embodiment.
Figure 11:
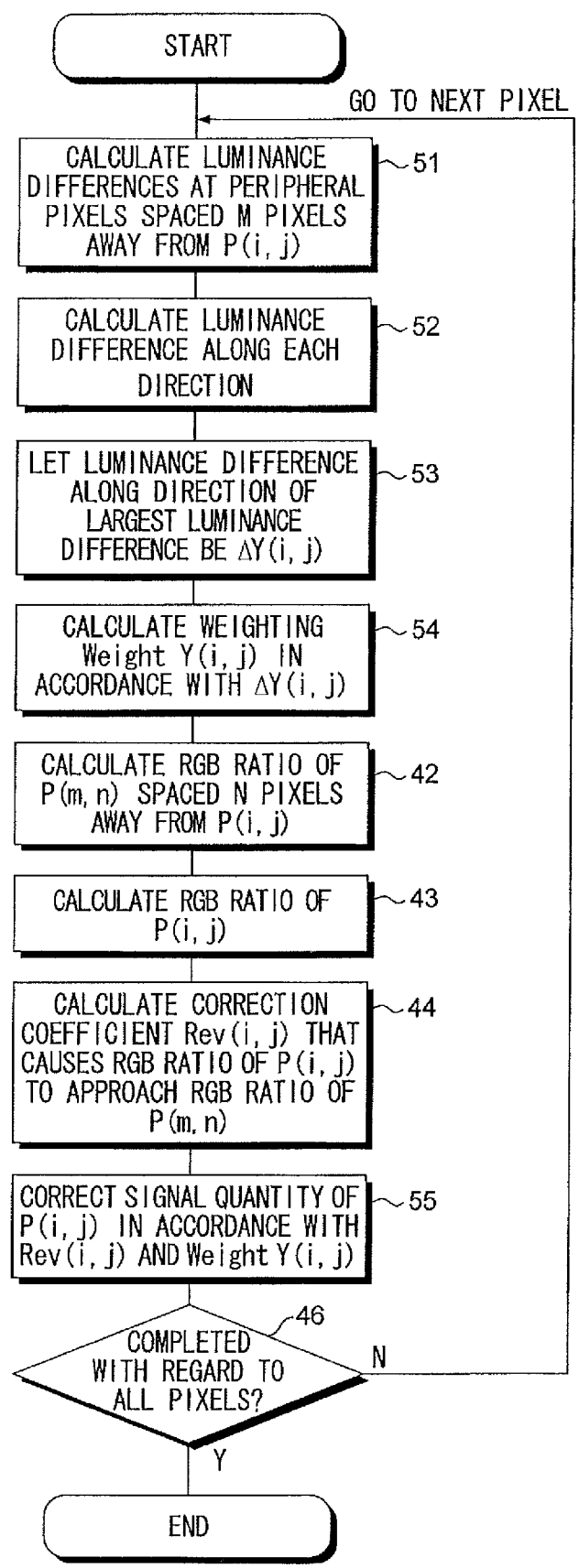
FIG. 11 is a flowchart illustrating the procedure of operation of a purple-fringe correction unit according to the second embodiment.

FIG. 10 is a block diagram illustrating the electrical configuration of a digital still camera according to a second embodiment, and FIG. 11 is a flowchart illustrating the processing executed by a PF correction unit 20A of a digital still camera according to the second embodiment. In the block diagram shown in FIG. 10, blocks identical with those in the block diagram of the digital still camera of the first embodiment shown in FIG. 5 are assigned like reference characters and need not be described again. In the flowchart shown in FIG. 11, processing identical with that in the flowchart shown in FIG. 6 is assigned like reference characters and need not be described again.

The PF correction unit 20A included in the digital still camera of the second embodiment differs from the PF correction unit 20 in the digital still camera of the first embodiment in that a pixel luminance calculation circuit 25, a luminance-difference calculation circuit 26 and a purple-fringe correction weighting Weight Y calculation circuit (PF correction weighting Weight Y calculation circuit) 27 are added and in that the PF determination circuit 21 is absent.

Luminance values Y at respective ones of eight peripheral pixels spaced M pixels away from the pixel of interest P(i,j) along the horizontal direction, vertical direction and two oblique directions (right oblique direction and left oblique direction) are calculated by the pixel luminance calculation circuit 25 (step 51) and the difference in luminance between two peripheral pixels symmetrical about the pixel of interest P(i,j) as center is calculated by the luminance-difference calculation circuit 26 (step 52). Processing for calculating the difference in luminance (steps 51, 52) will be described with reference to FIGS. 12, 13 and 14. Here a case where M=4 holds will described as an example.

Figure 12:
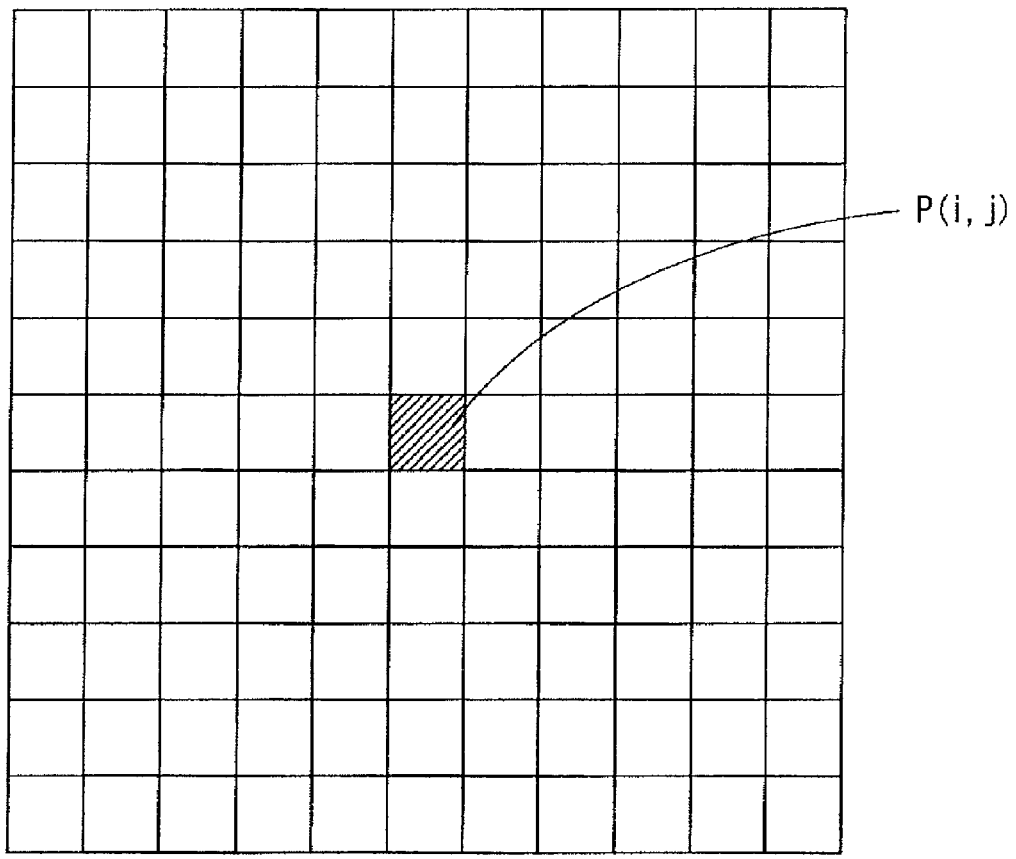
FIG. 12 illustrates how a pixel whose luminance is to be calculated is selected.
Figure 13:
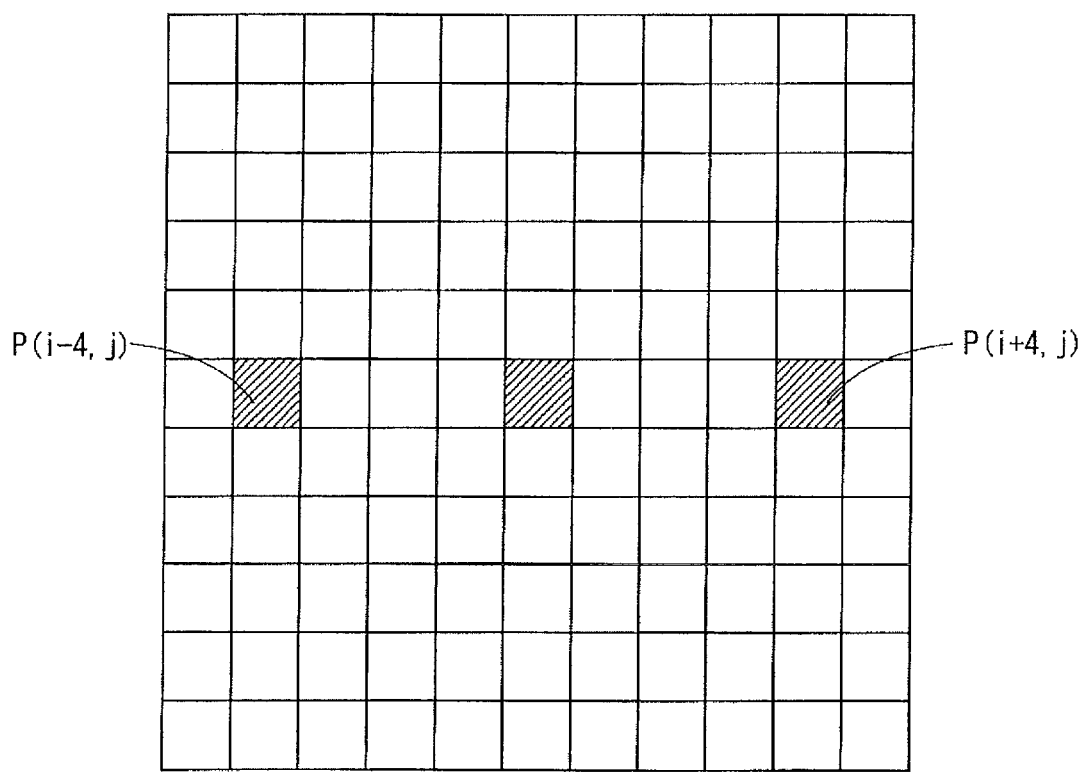
FIG. 13 illustrates how a pixel whose luminance is to be calculated is selected.

In a case where the pixel of interest P(i,j) is at the position shown in FIG. 12, peripheral pixels spaced four pixels away from the pixel of interest P(i,j) along the horizontal direction are pixels P(i−4,j) and P(i+4,j), as shown in FIG. 13. The luminance difference between the pixels P(i−4,j) and P(i+4,j) at the positions symmetrical about the pixel of interest P(i,j) as center is calculated.

Figure 14:
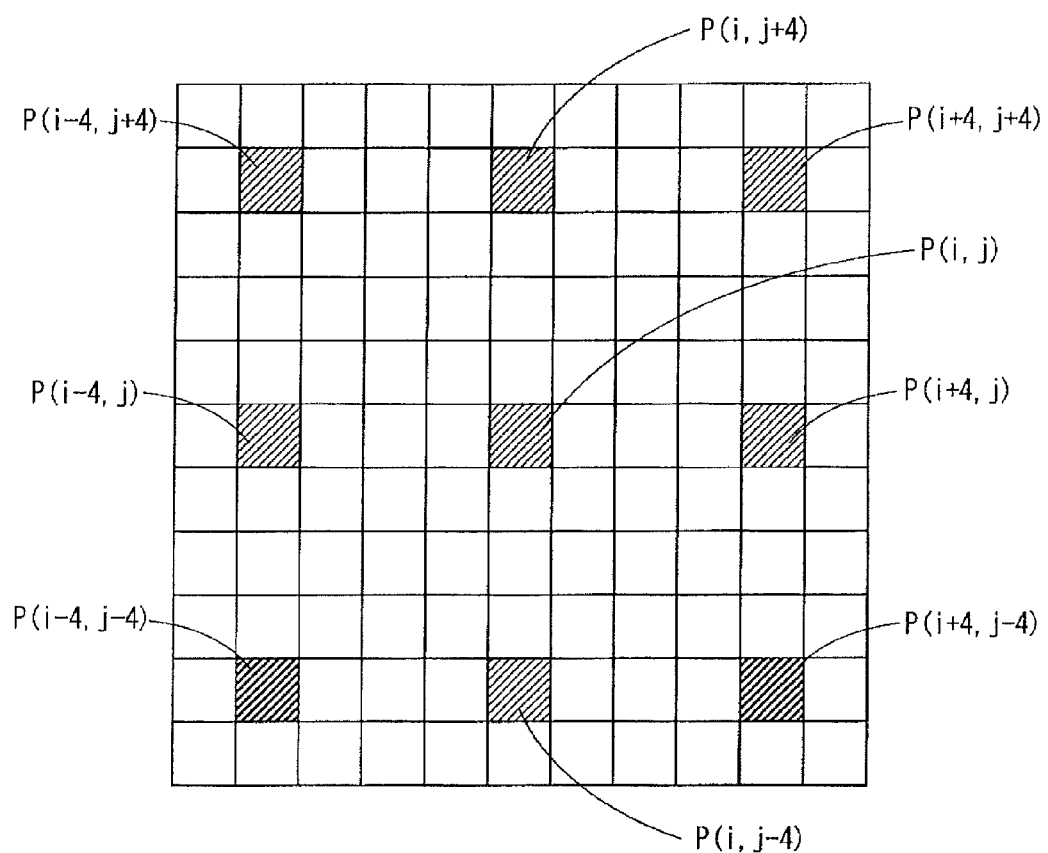
FIG. 14 illustrates how a pixel whose luminance is to be calculated is selected.

With regard also to the other peripheral pixels spaced four pixels away along the vertical direction, left oblique direction and right oblique direction, as shown in FIG. 14, luminance differences between the pixels that are at positions symmetrical about the pixel of interest P(i,j) are calculated. That is, the difference in luminance between pixels P(i,j+4) and P(i,j−4) along the vertical direction, the difference in luminance between pixels P(i−4,j+4) and P(i+4,j−4) along the left oblique direction, and the difference in luminance between pixels P(i+4,j+4) and P(i−4,j−4) along the right oblique direction are calculated. Thus, four luminance differences are calculated with retard to the pixel of interest P(i,j).

With reference again to FIG. 11, the largest luminance difference ΔY(i,j) among the four calculated luminance differences is selected by the PF correction weighting Weight Y calculation circuit 27 (step 53) and a weighting Weight Y(i,j) conforming to this largest luminance difference ΔY(i,j) is calculated (decided). The calculated weighting Weight Y(i,j) is applied to the PF correction processing circuit 24.

Figure 15:
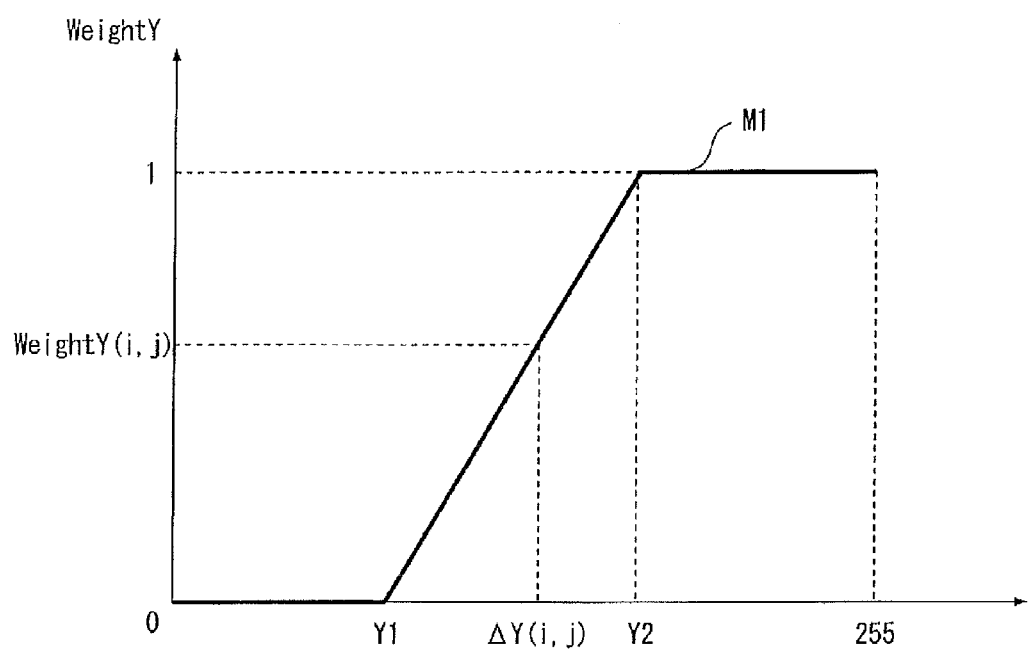
FIG. 15 illustrates a membership function.

FIG. 15 is a graph illustrating a membership function M1 used in calculating (deciding) the weighting Weight Y(i,j).

The membership function M1 used in calculating (deciding) the weighting Weight Y(i,j) is a function for deciding a weighting Weight Y(i,j) that differs in accordance with the luminance difference ΔY(i,j). The weighting Weight Y(i,j) is calculated based upon a value ranging from 0 to 1.

In a case where the luminance difference LY(i,j) is a value within a range of from 0 to a first prescribed luminance value Y1, weighting Weight Y(i,j)=0 holds. If the value is within a range of from the first prescribed luminance value Y1 to a second prescribed luminance value Y2, then a weighting Weight Y(i,j) the value of which is larger the larger the luminance difference ΔY(i,j) becomes is decided based upon the membership function M. If the luminance difference ΔY(i,j) calculated is greater than the second prescribed luminance value Y2, then weighting Weight Y(i,j)=1 is calculated.

The calculated weighting Weight Y(i,j) is applied to the PF correction processing circuit 24, as mentioned above. As described in the first embodiment, the correction coefficient RevB (i,j) regarding the blue (B) component calculated in the PF correction coefficient calculation circuit 23 also is applied to the PF correction processing circuit 24. The correction coefficient RevB (i,j) of the blue (B) component is weighted in the PF correction processing circuit 24 according to the following equation:

$$\text{weighted correction coefficient } \text{Rev}B(i,j) = \text{Rev}B(i,j) \times \text{Weight } Y(i,j) \qquad \text{Equation 9}$$

The blue (B) component [or red (R) component] of the pixel of interest P(i,j) is color-corrected by the PF correction processing circuit 24 in accordance with the weighted correction coefficient Rev (i,j) (step 55; see Equation 7).

In a case where the luminance difference ΔY(i,j) between peripheral pixels of the pixel of interest P(i,j) is small, that is, if the luminance difference ΔY(i,j) is a value within the range of from 0 to the first prescribed luminance value Y1 in FIG. 15, then the weighting Weight Y(i,j) becomes 0. The weighted correction coefficient RevB (i,j), therefore, becomes 0. In this case, a color correction is not applied to the blue (B) component of the pixel of interest P(i,j). Specifically, it is judged that the pixel of interest P(i,j) has not developed purple fringing, and this means that a color correction for reducing purple fringing is not carried out.

If the luminance difference ΔY(i,j) of peripheral pixels of the pixel of interest P(i,j) is greater than the second prescribed value Y2 in FIG. 15, the weighting Weight Y(i,j) becomes 1. The correction coefficient RevB (i,j) is used as is as the weighted correction coefficient RevB (i,j) (Equation 9).

If the luminance difference ΔY(i,j) of peripheral pixels of the pixel of interest P(i,j) is a value within a range of from the first prescribed luminance value Y1 to the second prescribed luminance value Y2, then the weighting Weight Y(i,j) becomes a value larger than 0 and smaller than 1. The smaller the maximum luminance difference ΔY(i,j), the smaller the value of the weighted correction coefficient RevB (i,j) and, hence, the weaker the effect of the color correction.

The larger the luminance difference at an image contour, the stronger purple fringing manifests itself. In the second embodiment, whether each pixel is a pixel to undergo purple-fringe reduction processing [namely a purple-fringed pixel P(i,j)] is determined using the maximum luminance difference ΔY(i,j) between the pixel of interest (i,j) and peripheral pixel P, as described above. The accuracy of the determination as to whether purple fringing has occurred is high. Further, since the effect of the color correction using the correction coefficient RevB (i,j) is weakened by weighting using the membership function M1, i.e., in accordance with the likelihood that a pixel is purple-fringed pixel P(i,j), erroneous corrections are reduced.

The membership function M1 (FIG. 15) may be stored in the form of a look-up table in the PF correction weighting Weight Y calculation circuit 27 or may be stored in the ROM 9B.

Third Embodiment

Figure 16:
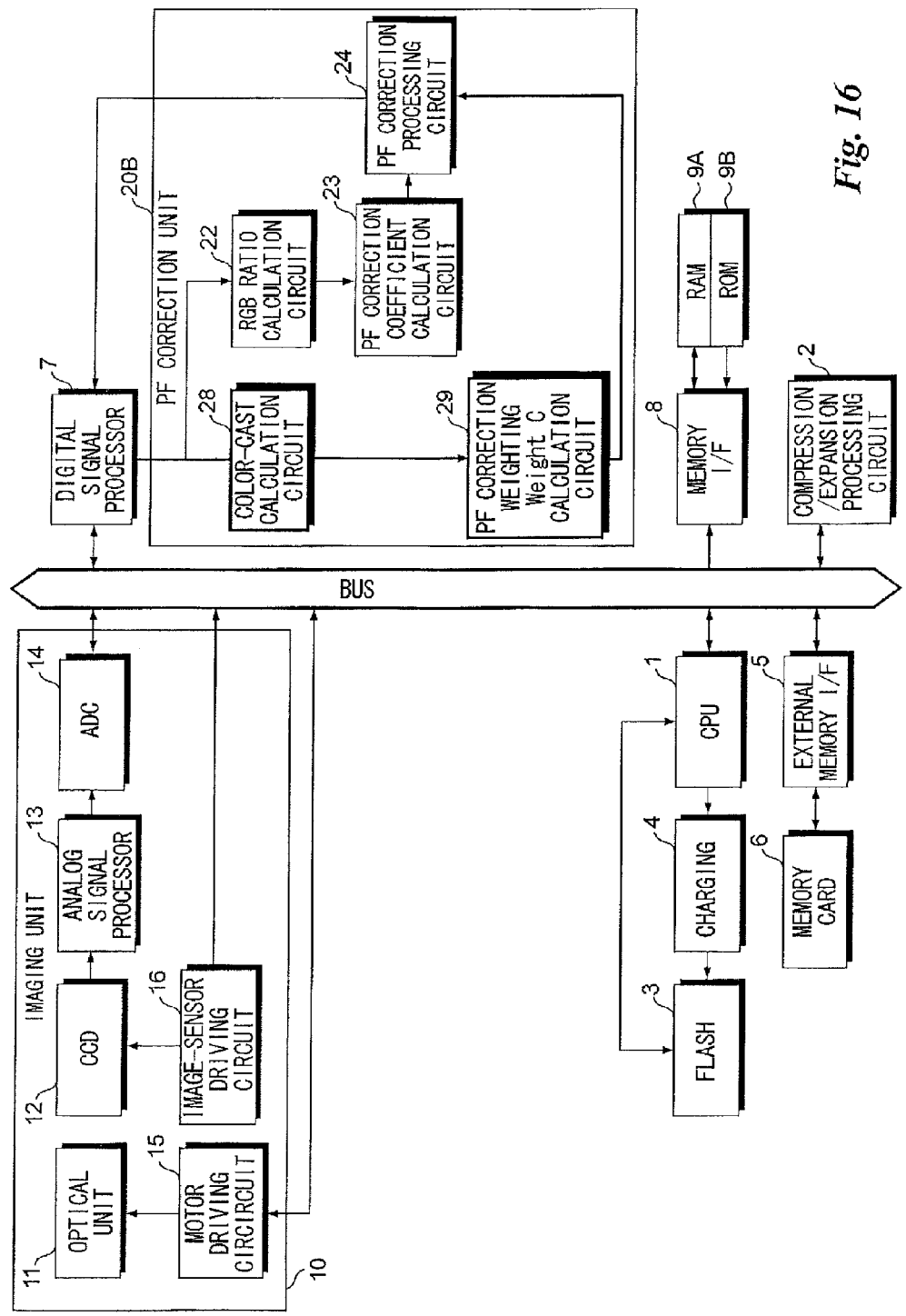
FIG. 16 is a block diagram illustrating the electrical configuration of a digital still camera according to a third embodiment.
Figure 17:
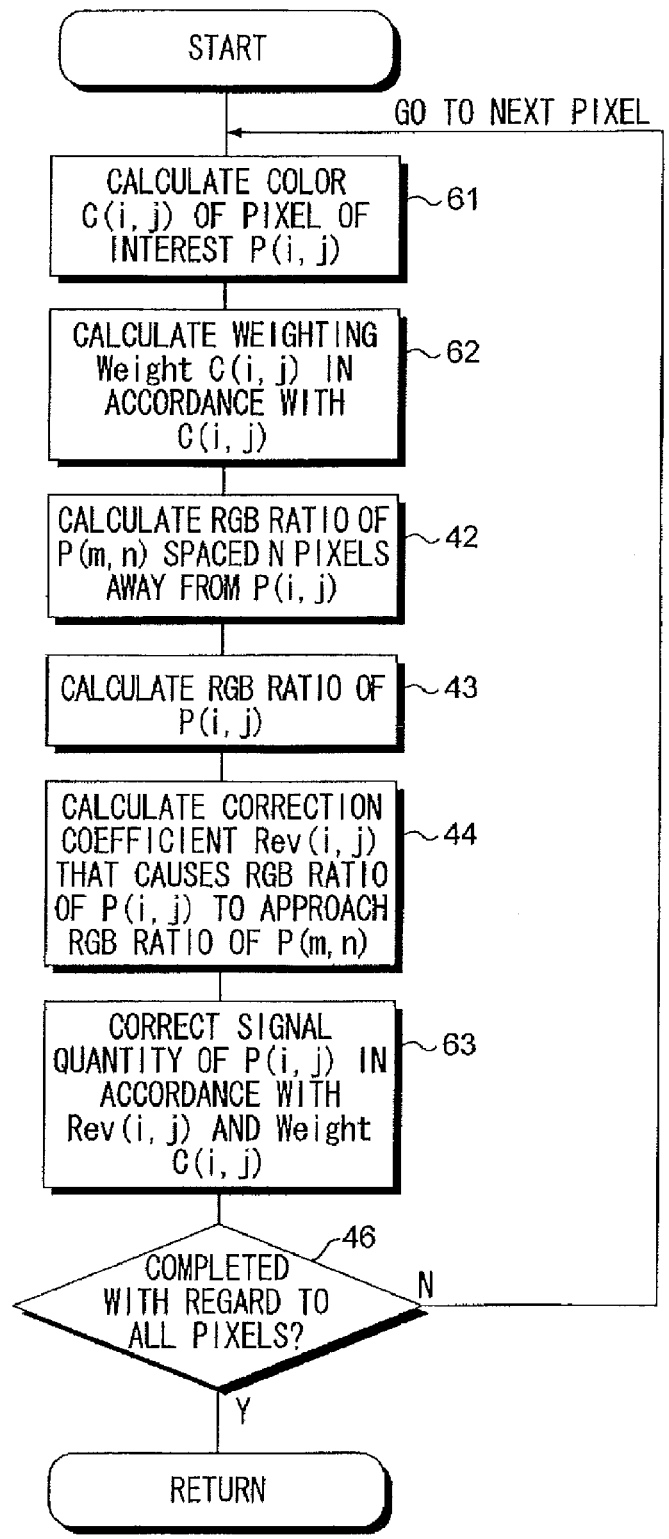
FIG. 17 is a flowchart illustrating the procedure of operation of a purple-fringe correction unit according to the third embodiment.

FIG. 16 is a block diagram illustrating the electrical configuration of a digital still camera according to a third embodiment. FIG. 17 is a flowchart illustrating the processing executed by a PF correction unit 20B of a digital still camera according to the third embodiment. In the block diagram shown in FIG. 16, blocks identical with those in the block diagram of the digital still camera of the second embodiment shown in FIG. 10 are assigned like reference characters and need not be described again. In the flowchart shown in FIG. 17, processing identical with that in the flowchart shown in FIG. 11 is assigned like reference characters and need not be described again.

The PF correction unit 20B included in the digital still camera of the third embodiment differs from the PF correction unit 20A in the digital still camera of the second embodiment in that a color-cast calculation circuit 28 and a purple-fringe correction weighting Weight C calculation circuit (PF correction weighting Weight C calculation circuit) 29 are provided instead of the pixel luminance calculation circuit 25, the luminance-difference calculation circuit 26 and PF correction weighting Weight Y calculation circuit 27.

Color difference data (Cr data and Cb data) of the pixel of interest P(i,j) is calculated by the color-cast calculation circuit 28 (step 61). Then, using a membership function M2 regarding the Cr data and a membership function M3 regarding the Cb data, the PF correction weighting Weight C calculation circuit 29 calculates a weighing Weight Cr and a weighting Weight Cb regarding color cast with respect to the pixel of interest P(i,j) (step 62).

Figure 18:
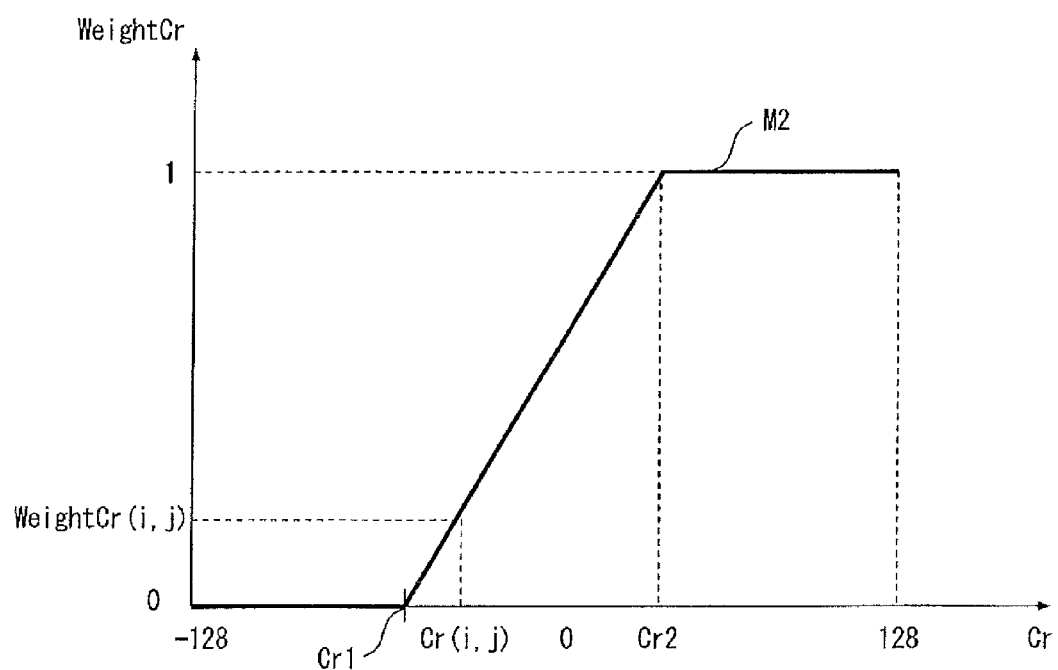
FIG. 18 illustrates a membership function.
Figure 19:
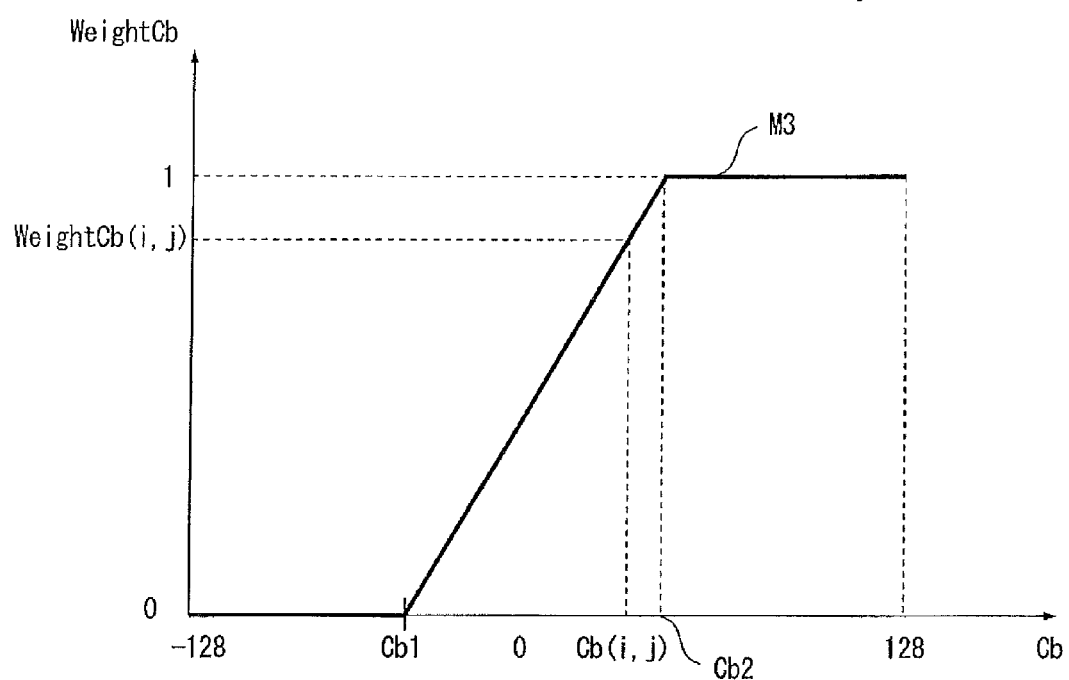
FIG. 19 illustrates a membership function.

FIG. 18 illustrates the membership function M2 regarding the Cr data and FIG. 19 the membership function M3 regarding the Cb data.

If the Cr data is a value within a range of from −128 to a first color difference value Cr1 in FIG. 18, 0 is calculated as weighting [Weight Cr(i,j)] relating to the Cr data. In a case where the Cr data is greater than a second color difference value Cr2, 1 is decided as the weighting Weight Cr(i,j) relating to the Cr data. If the Cr data is a value within a range of from the first color difference value Cr1 to the second color difference value Cr2, then a weighting Weight Cr(i,j) the value of which is smaller the smaller the Cr data becomes is decided based upon the membership function M2 within the range of from 0 to 1.

With reference to FIG. 19, the same holds true for the Cb data. If the Cb data is a value within a range of from −128 to a first color difference value Cb1, 0 is calculated as weighting [Weight Cb(i,j)] relating to the Cb data. In a case where the Cb data is greater than a second color difference value Cb2, 1 becomes the weighting Weight Cb(i,j) of the Cb data. If the Cb data is a value within a range of from the first color difference value Cb1 to the second color difference value Cb2, then a weighting Weight Cb(i,j) the value of which is smaller the smaller the Cb data becomes is decided based upon the membership function M3 within the range of from 0 to 1.

When the weighting Weight Cr(i,j) of the Cr data and the weighting Weight Cb(i,j) of the Cb data are decided with regard to the pixel of interest P(i,j), the two weightings are consolidated and a PF correction weighting Weight C is calculated according to the following equation:

PF correction weighting Weight $C(i,j)$=Weight $Cr(i,j)$×Weight $Cb(i,j)$    Equation 10

In a manner similar to the second embodiment, the calculated PF correction weighting Weight C (i,j) is used in weighting the correction coefficient Rev(i,j). The correction coefficient RevB (i,j) of the blue (B) component is weighted in the PF correction processing circuit 24 according to the following equation:

weighted correction coefficient $RevB(i,j)$=$RevB(i,j)$×Weight $C(i,j)$    Equation 11

The blue (B) component [or red (R) component] of the pixel of interest P(i,j) is color-corrected by the PF correction processing circuit 24 in accordance with the weighted correction coefficient RevB (i,j) (step 63; see Equation 7).

The membership functions M2, M3 relating to the color difference data are decided from the standpoint of whether there is close proximity to the color cast of the color purple. Purple fringing manifests itself as the color purple, as mentioned above. In a case where the color cast of the pixel of interest P(i,j) is the color purple or a color near purple (in a case where the pixel of interest P(i,j) has color difference data Cr, Cb representing color purple), 1 or a value near 1 is calculated based upon the membership functions M2, M3. In this case, the color coefficient Rev (i,j) calculated by the PF correction coefficient calculation circuit 23 is used as is (Equation 11). On the other hand, the more the color cast of the pixel of interest P(i,j) is a color cast different from the color purple, the effect of applying the color correction is weakened by weighting. Erroneous corrections in correction of color are reduced.

Naturally, in order to prevent the color correction of a purple pixel at a position that is not in the vicinity of an image contour where the luminance difference is large, only a pixel in the vicinity of an image contour where the luminance difference is large may be adopted as the pixel of interest P(i,j).

Fourth Embodiment

Figure 20:
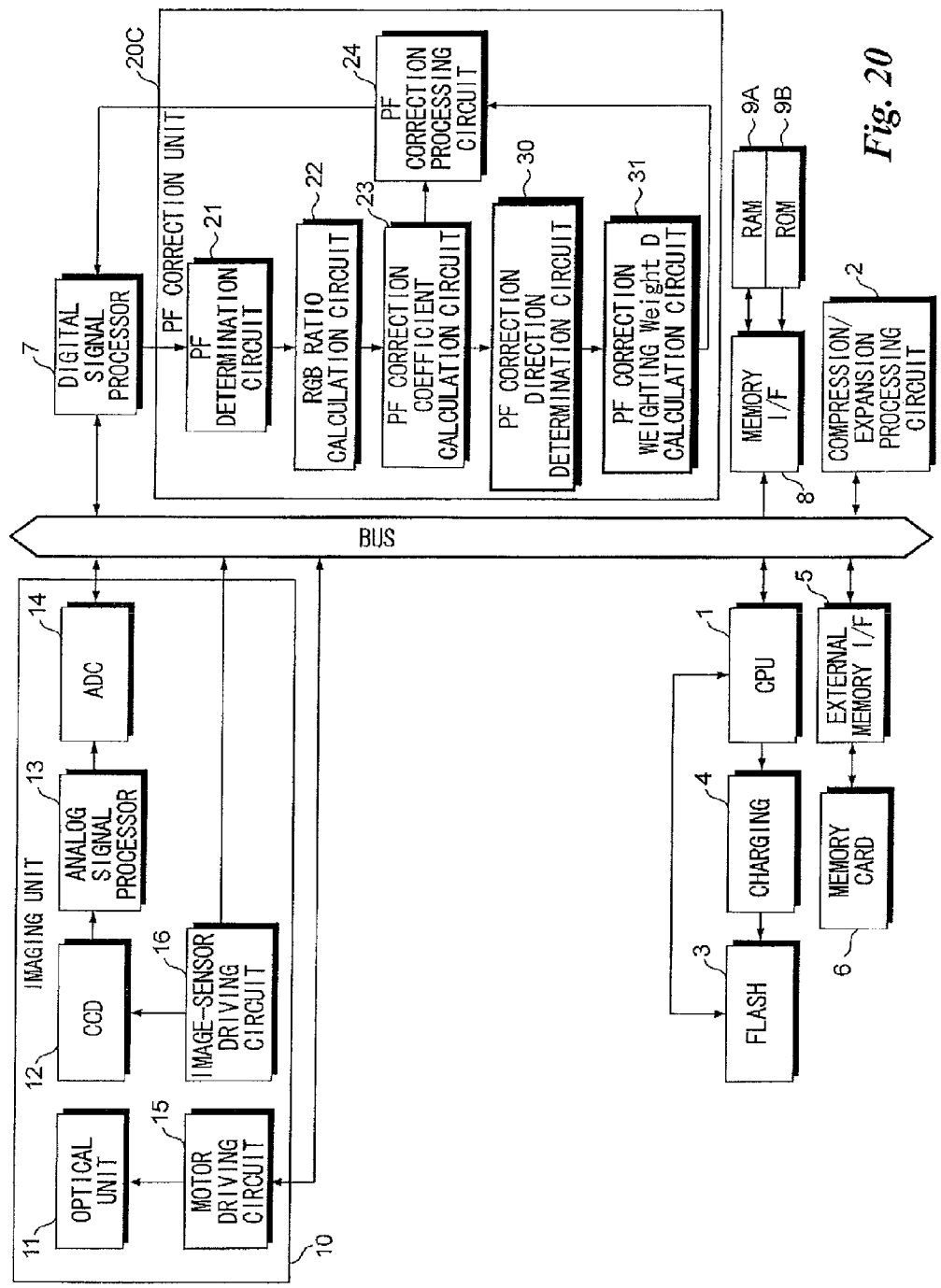
FIG. 20 is a block diagram illustrating the electrical configuration of a digital still camera according to a fourth embodiment.
Figure 21:
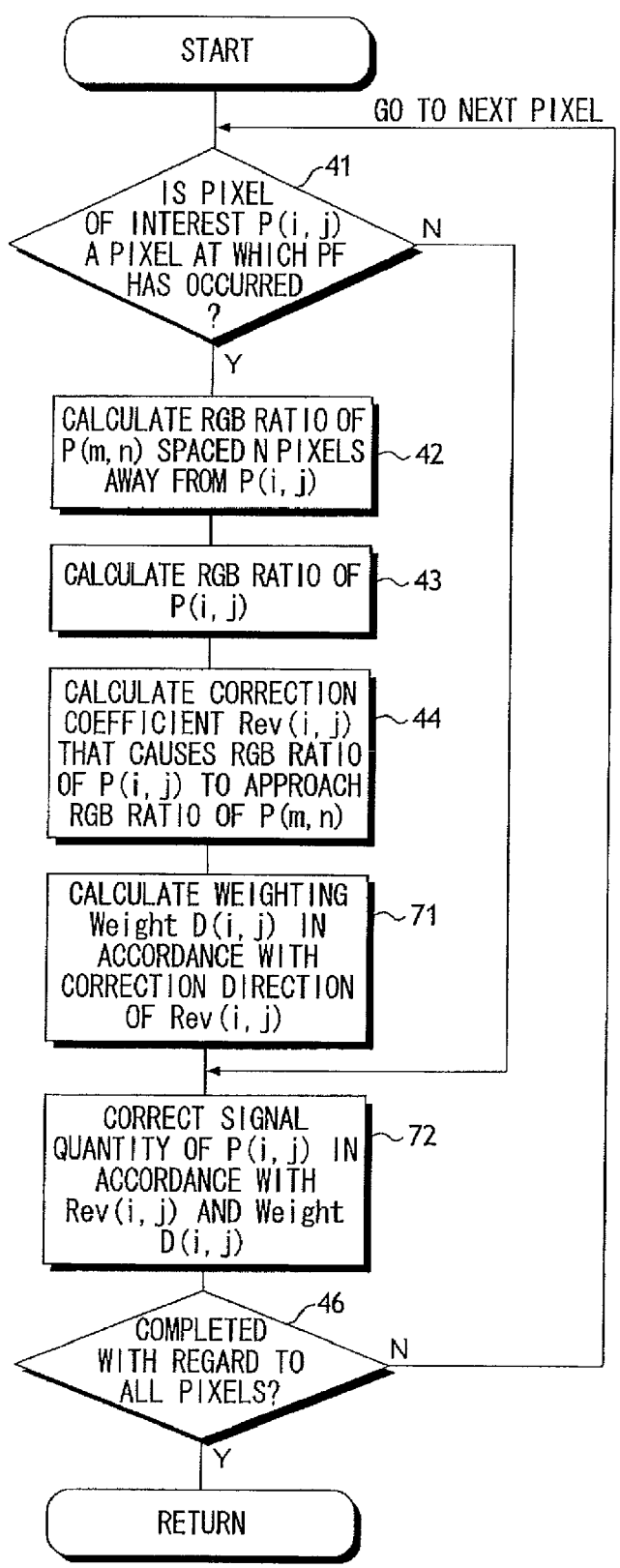
FIG. 21 is a flowchart illustrating the procedure of operation of a purple-fringe correction unit according to the fourth embodiment.

FIG. 20 is a block diagram illustrating the electrical configuration of a digital still camera according to a fourth embodiment. FIG. 21 is a flowchart illustrating the processing executed by a PF correction unit 20C of a digital still camera according to the fourth embodiment. In the block diagram shown in FIG. 20, blocks identical with those in the block diagram of the digital still camera of the first embodiment shown in FIG. 5 are assigned like reference characters and need not be described again. In the flowchart shown in FIG. 21, processing identical with that in the flowchart shown in FIG. 6 is assigned like reference characters and need not be described again.

The purple-fringe correction unit 20C is equipped with a purple-fringe correction direction determination circuit (PF correction direction determination circuit) 30 and a purple-fringe correction weighting Weight D calculation circuit (PF correction weighting Weight D calculation circuit) 31 in addition to the PF determination circuit 21, RGB ratio calculation circuit 22, PF correction coefficient calculation circuit 23 and PF correction processing circuit 24 described in the first embodiment.

As mentioned above, the purple-fringed pixel P(i,j) is a pixel for which the signal quantities of the blue (B) component and red (R) component are larger than the signal quantity of the green (G) component, and therefore a color correction that lowers the signal quantities of the blue (B) component and red (R) component is performed in processing for reducing purple fringing. In the fourth embodiment, the correcting effect of the correction coefficient is eliminated or weakened in a case where values greater than 1 are calculated as the correction coefficient RevB (i,j) and correction coefficient RevR (i,j), namely a case where a correction coefficient RevB (i,j) and a correction coefficient RevR (i,j) that further enlarge the signal quantities of the blue (B) component and red (R) component are calculated, owing to erroneous detection, etc., of the purple-fringed pixel P(i,j).

Figure 22:
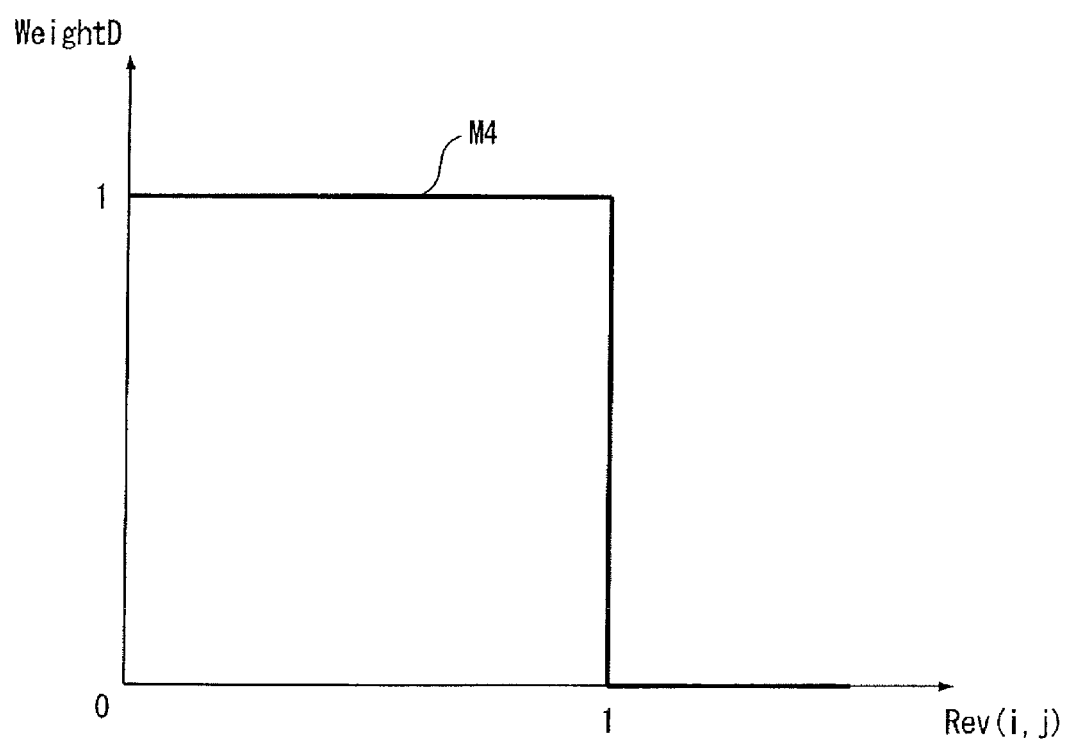
FIG. 22 illustrates a membership function.

FIG. 22 is a graph illustrating a membership function M4 used in calculating a weighting Weight D(i,j) conforming to the correction coefficient Rev (i,j).

With regard to the blue component, if, in accordance with whether the correction coefficient RevB (i,j) calculated by the PF correction coefficient calculation circuit 23 will further enlarge the signal quantity of the blue (B) component (i.e., whether the direction of the correction is in the plus direction or not), it is found that the signal quantity will be enlarged, then "0" is calculated (decided) as the weighting Weight D(i,j), and if it is found that the signal quantity will not be enlarged, then "1" is calculated as the weighting Weight D(i,j) by the PF correction direction determination circuit 30 (step 71; FIG. 22). Specifically, in a case where a correction coefficient RevR (i,j) that exceeds 1 has been calculated as the correction coefficient RevB (i,j) by the PF correction coefficient calculation circuit 23, a value (=0) that eliminates the effect of the color correction is calculated as the weighting Weight D.

If the weighting Weight D(i,j) is "1", the color correction is performed using the correction coefficient RevB (i,j) as is. If the weighting Weight D(i,j) is "0", then the color correction is not carried out. This is similar to the situation in the second and third embodiments described above. Similar processing is executed with regard to the red (R) component as well.

It can be arranged so that when a malfunction or the like occurs in the PF correction coefficient calculation circuit 23 and a correction coefficient that will further enlarge the signal quantities of the blue (B) component and red (R) component is obtained, the PF correction is not carried and an erroneous correction is prevented before it occurs.

The invention claimed is:

1. An image processing method comprising the steps of:
accepting input of applied image data;
determining whether purple fringing has occurred pixel by pixel with regard to the accepted image data;
calculating an RGB ratio of a purple-fringed pixel at which occurrence of purple fringing has been determined and an RGB ratio of a purple-fringe convergence pixel spaced a prescribed number of pixels away from said purple-fringed pixel within a zone in the proximity of the purple-fringed pixel;
calculating a purple-fringe correction coefficient that causes the RGB ratio of said purple-fringed pixel to approach the RGB ratio of said purple-fringe convergence pixel; and
correcting the color of said purple-fringed pixel using the calculated purple-fringe correction coefficient.

2. An image processing method according to claim 1, wherein said purple-fringe correction coefficient is a correction coefficient applied to at least one of a blue-component signal and red-component signal of the purple-fringed pixel.

3. An image processing method according to claim 1, wherein from among peripheral pixels of an image contour exhibiting a luminance difference greater than a prescribed level, a pixel for which at least a blue-component signal level is higher than a green-component signal level by more than a prescribed threshold value is determined to be a purple-fringed pixel.

4. An image processing method according to claim 1, wherein a pixel situated along a direction in which a luminance difference of an image contour in the vicinity of said purple-fringed pixel is largest, and along which luminance decreases, is used as said purple-fringe convergence pixel.

5. An image processing method according to claim 1, wherein in a case where said purple-fringe correction coefficient increases the signal quantity of at least one of a blue-component signal and a red-component signal of said purple-fringed pixel, said purple-fringe correction coefficient is adjusted in such a manner that effect of the color correction of the purple-fringed pixel is weakened.

6. An image processing method comprising the steps of:
accepting input of applied image data;
calculating, pixel by pixel of interest with regard to the accepted image data, luminances of pixels at respective ones of positions symmetrical about said pixel of interest as center with regard to at least one direction among a horizontal direction, vertical direction and oblique direction;
calculating differences between the calculated luminances;
selecting the maximum luminance difference among the luminance differences calculated;
calculating a weighting which is smaller the smaller the maximum luminance difference selected;
calculating an RGB ratio of said pixel of interest and an RGB ratio of a spaced-away pixel spaced a prescribed number of pixels away from said pixel of interest within a zone in the proximity of the pixel of interest;
calculating a correction coefficient that causes the RGB ratio of said pixel of interest to approach the RGB ratio of said spaced-away pixel; and
correcting the color of said pixel of interest using a weighted correction coefficient obtained by weighting the calculated correction coefficient by the weighting calculated.

7. An image processing method according to claim 6, wherein a pixel situated along a direction in which a luminance difference of an image contour in the vicinity of said pixel of interest is largest, and along which luminance decreases, is used as said spaced-away pixel.

8. An image processing method according to claim 6, wherein a weighting calculated in a case where the maximum luminance difference is smaller than a prescribed value eliminates the effect of color correction by said weighted correction coefficient.

9. An image processing method comprising the steps of:
accepting input of applied image data;
determining, pixel by pixel of interest with regard to the accepted image data, whether color cast of said pixel of interest is the color purple;
calculating a weighting which is smaller the farther the color cast of said pixel of interest is from the color purple;
calculating an RGB ratio of said pixel of interest and an RGB ratio of a spaced-away pixel spaced a prescribed number of pixels away from said pixel of interest within a zone in the proximity of said pixel of interest;
calculating a correction coefficient that causes the RGB ratio of said pixel of interest to approach the RGB ratio of said spaced-away pixel; and
correcting the color of said pixel of interest using a weighted correction coefficient obtained by weighting the calculated correction coefficient by the weighting calculated.

10. An image processing method according to claim 9, wherein a pixel situated along a direction in which a luminance difference of an image contour in the vicinity of said pixel of interest is largest, and along which luminance decreases, is used as said spaced-away pixel.

11. An image processing method according to claim 9, wherein a weighting calculated in a case where the color cast of said pixel of interest is a color cast not recognized as the color purple eliminate the effect of color correction by said weighted correction coefficient.

12. An image processing method according to claim 6, wherein in a case where the calculated correction coefficient increases the signal quantity of at least one of a blue-component signal and a red-component signal of said pixel of interest, said correction coefficient is adjusted in such a manner that effect of the color correction is weakened.

13. An image processing apparatus comprising:
an image data input unit for accepting input of applied image data;
a purple-fringe determination circuit for determining whether purple fringing has occurred pixel by pixel with regard to the image data accepted by said image data input unit;
an RGB ratio calculation circuit for calculating an RGB ratio of a purple-fringed pixel at which occurrence of purple fringing has been determined by said purple-fringe determination circuit and an RGB ratio of a purple-fringe convergence pixel spaced a prescribed number of pixels away from said purple-fringed pixel within a zone in the proximity of the purple-fringed pixel;
a purple-fringe correction coefficient calculation circuit for calculating a purple-fringe correction coefficient that causes the RGB ratio of said purple-fringed pixel to approach the RGB ratio of said purple-fringe convergence pixel; and
a purple-fringe reducing unit for correcting the color of said purple-fringed pixel using the purple-fringe correction coefficient calculated by said purple-fringe correction coefficient calculation circuit.

14. An image processing apparatus comprising:
an image data input unit for accepting input of applied image data;
a luminance calculation circuit for calculating, pixel by pixel of interest with regard to the image data accepted by said image data input unit, luminances of pixels at respective ones of positions symmetrical about said pixel of interest as center with regard to at least one direction among a horizontal direction, vertical direction and oblique direction;
a luminance-difference calculation circuit for calculating differences between the luminances calculated by said luminance calculation circuit;
a maximum-luminance-difference selecting unit for selecting the maximum luminance difference calculated by said luminance calculation circuit;
a weighting calculation unit for calculating a weighting which is smaller the smaller the maximum luminance difference selected by said maximum-luminance selecting unit;
an RGB value calculation circuit for calculating an RGB ratio of said pixel of interest and an RGB ratio of a spaced-away pixel spaced a prescribed number of pixels away from said pixel of interest within a zone in the proximity of the pixel of interest;
a correction coefficient calculation circuit for calculating a correction coefficient that causes the RGB ratio of said pixel of interest to approach the RGB ratio of said spaced-away pixel; and
a color correcting circuit for correcting the color of said pixel of interest using a weighted correction coefficient obtained by weighting the correction coefficient, which has been calculated by said correction coefficient calculation circuit, by the weighting calculated by the weighting calculation unit.

15. An image processing apparatus comprising:
an image data input unit for accepting input of applied image data;
a color-cast determination unit for determining, pixel by pixel of interest with regard to the image data accepted by said image input unit, whether color cast of said pixel of interest is the color purple;
a weighting calculation circuit for calculating a weighting which is smaller the farther the color cast of said pixel of interest is from the color purple;
an RGB ratio calculation circuit for calculating an RGB ratio of said pixel of interest and an RGB ratio of a spaced-away pixel spaced a prescribed number of pixels away from said pixel of interest within a zone in the proximity of said pixel of interest;
a correction coefficient calculation circuit for calculating a correction coefficient that causes the RGB ratio of said pixel of interest to approach the RGB ratio of said spaced-away pixel; and
a color correcting circuit for correcting the color of said pixel of interest using a weighted correction coefficient obtained by weighting the correction coefficient, which has been calculated by said correction coefficient calculation circuit, by the weighting calculated by said weighting calculation circuit.

16. A non-transitory computer readable medium storing a program for causing a computer system to operate as an image processing apparatus, said program controlling said computer system so as to:
accept input of applied image data;
determine whether purple fringing has occurred pixel by pixel with regard to the accepted image data;
calculate an RGB ratio of a purple-fringed pixel at which occurrence of purple fringing has been determined and an RGB ratio of a purple-fringe convergence pixel spaced a prescribed number of pixels away from said purple-fringed pixel within a zone in the proximity of the purple-fringed pixel;
calculate a purple-fringe correction coefficient that causes the RGB ratio of said purple-fringed pixel to approach the RGB ratio of said purple-fringe convergence pixel; and
correct the color of said purple-fringed pixel using the calculated purple-fringe correction coefficient.

17. A non-transitory computer readable medium storing a program for causing a computer system to operate as an image processing apparatus, said program controlling said computer system so as to:
accept input of applied image data;
calculate, pixel by pixel of interest with regard to the accepted image data, luminances of pixels at respective ones of positions symmetrical about said pixel of interest as center with regard to at least one direction among a horizontal direction, vertical direction and oblique direction;
calculate differences between the calculated luminances;
select the maximum luminance difference among the luminance differences calculated;
calculate a weighting which is smaller the smaller the maximum luminance difference selected;
calculate an RGB ratio of said pixel of interest and an RGB ratio of a spaced-away pixel spaced a prescribed number of pixels away from said pixel of interest within a zone in the proximity of the pixel of interest;
calculate a correction coefficient that causes the RGB ratio of said pixel of interest to approach the RGB ratio of said spaced-away pixel; and
correct the color of said pixel of interest using a weighted correction coefficient obtained by weighting the calculated correction coefficient by the weighting calculated.

18. A non-transitory computer readable medium storing a program for causing a computer system to operate as an image processing apparatus, said program controlling said computer system so as to:
accept input of applied image data;
determine, pixel by pixel of interest with regard to the accepted image data, whether color cast of said pixel of interest is the color purple;
calculate a weighting which is smaller the farther the color cast of said pixel of interest is from the color purple;
calculate an RGB ratio of said pixel of interest and an RGB ratio of a spaced-away pixel spaced a prescribed number of pixels away from said pixel of interest within a zone in the proximity of said pixel of interest;
calculate a correction coefficient that causes the RGB ratio of said pixel of interest to approach the RGB ratio of said spaced-away pixel; and
correct the color of said pixel of interest using a weighted correction coefficient obtained by weighting the calculated correction coefficient by the weighting calculated.

19. An image processing method according to claim 9, wherein in a case where the calculated correction coefficient increases the signal quantity of at least one of a blue-component signal and a red-component signal of said pixel of interest, said correction coefficient is adjusted in such a manner that effect of the color correction is weakened.

* * * * *